(12) United States Patent
Umeda et al.

(10) Patent No.: US 12,219,277 B2
(45) Date of Patent: Feb. 4, 2025

(54) SOLID-STATE IMAGING DEVICE WITH OFFSET CURRENT GENERATION

(71) Applicant: Sony Semiconductor Solutions Corporation, Kanagawa (JP)

(72) Inventors: Kengo Umeda, Tokyo (JP); Youhei Oosako, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 166 days.

(21) Appl. No.: 18/016,552

(22) PCT Filed: Aug. 17, 2021

(86) PCT No.: PCT/JP2021/029971
§ 371 (c)(1),
(2) Date: Jan. 17, 2023

(87) PCT Pub. No.: WO2022/050035
PCT Pub. Date: Mar. 10, 2022

(65) Prior Publication Data
US 2023/0283921 A1 Sep. 7, 2023

(30) Foreign Application Priority Data

Sep. 7, 2020 (JP) .................................. 2020-150066

(51) Int. Cl.
*H04N 25/633* (2023.01)
*H04N 25/78* (2023.01)

(52) U.S. Cl.
CPC ........... *H04N 25/633* (2023.01); *H04N 25/78* (2023.01)

(58) Field of Classification Search
CPC ...... H04N 25/633; H04N 25/78; H04N 25/79; H04N 25/63; H04N 25/77
(Continued)

(56) References Cited

U.S. PATENT DOCUMENTS

| 2003/0071748 A1* | 4/2003 | Huang | H04N 25/75 348/E5.079 |
| 2012/0008028 A1* | 1/2012 | Egawa | H04N 25/78 348/300 |

(Continued)

FOREIGN PATENT DOCUMENTS

| JP | 2012114578 A | 6/2012 |
| JP | 2013085104 A | 5/2013 |

(Continued)

OTHER PUBLICATIONS

International Search Report (PCT/ISA/210), International Application No. PCT/JP2021/029971, dated Nov. 9, 2021.

*Primary Examiner* — Usman A Khan
(74) *Attorney, Agent, or Firm* — Michael Best & Friedrich LLP

(57) ABSTRACT

Solid-state imaging devices are disclosed. In one example, a solid-state imaging device includes an AD converter that obtains an electric signal from a pixel and performs AD conversion on the electric signal. The electric signal is compared with a reference signal that has a voltage changing with the lapse of time. The reference signal is generated by a reference signal generator with a first current circuit that causes a first current to flow, an output circuit including a first input unit connected to the first current circuit, a second input unit that receives a reference voltage for determining an initial value of the reference signal, and an output unit that outputs the reference signal on the basis of voltages of the first input unit and the second input unit. A first capacitive element changes the reference signal by accumulating or discharging the first current.

12 Claims, 20 Drawing Sheets

(58) Field of Classification Search
USPC .......................................................... 348/300
See application file for complete search history.

(56) References Cited

U.S. PATENT DOCUMENTS

2013/0087688 A1* 4/2013 Saito ....................... H03M 1/56
327/132
2017/0064237 A1* 3/2017 Aibara ................... H04N 25/75

FOREIGN PATENT DOCUMENTS

| JP | 2017046259 A | 3/2017 |
| JP | 2019153987 A | 9/2019 |

* cited by examiner

SOLID-STATE IMAGING DEVICE WITH OFFSET CURRENT GENERATION

TECHNICAL FIELD

The present disclosure relates to a solid-state imaging device.

BACKGROUND ART

A solid-state imaging device such as a CMOS image sensor is provided with an analog-to-digital converter (ADC) circuit that converts an analog signal from a pixel unit into a digital signal. The ADC circuit compares the analog signal with a ramp signal whose voltage changes with the lapse of time, and generates a digital signal on the basis of a count value of a clock signal. A ramp generation circuit that generates such a ramp signal may shift a starting voltage of the ramp signal by switching an input voltage to eliminate a dark current component of the pixel.

However, a circuit that supplies the input voltage to the ramp generation circuit or a circuit that switches the input voltage may generate noise in the ramp signal.

CITATION LIST

Patent Document

Patent Document 1: Japanese Patent Application Laid-Open No. 2013-085104
Patent Document 2: Japanese Patent Application Laid-Open No. 2019-153987

SUMMARY OF THE INVENTION

Problems to be Solved by the Invention

There is provided a solid-state imaging device capable of suppressing mixing of noise into a ramp signal while eliminating a dark current component of the ramp signal.

Solutions to Problems

A solid-state imaging device according to the present disclosure is a solid-state imaging device that generates a reference signal that is compared with an electric signal from a pixel unit in order to perform AD conversion on the electric signal and has a voltage changing with a lapse of time, the solid-state imaging device including a first current circuit that causes a first current to flow, an output circuit including a first input unit connected to the first current circuit, a second input unit that receives a reference voltage for determining an initial value of the reference signal, and an output unit that outputs the reference signal on the basis of voltages of the first input unit and the second input unit, a first capacitive element that is connected to the first input unit or the output unit and changes the reference signal by accumulating or discharging the first current, and an offset generation unit that causes an offset current to flow through the output circuit or the first capacitive element.

The output circuit may be a differential amplifier circuit including a first current path that receives a voltage of the first input unit, a second current path that receives a voltage of the second input unit, and a detection transistor that amplifies a voltage generated in the second current path and outputs the amplified voltage from the output unit, the first capacitive element may be connected between the first input unit and the output unit, and the offset generation unit may cause the offset current to flow through the first or second current path.

The offset generation unit may include a current source that causes the offset current to flow, a first offset switch connected between the first current path and the current source, and a second offset switch connected between the second current path and the current source.

When a voltage of the reference signal is offset in either a high direction or a low direction in the AD conversion, the first offset switch may be turned on and the second offset switch may be turned off, and when the voltage of the reference signal is offset in the other of the high direction and the low direction in the AD conversion, the first offset switch may be turned off and the second offset switch may be turned on.

A voltage generation unit that generates the reference voltage, a reference voltage switch provided between the voltage generation unit and the second input unit, and a storage capacitor connected between the second input unit and a predetermined voltage source may be further included.

When the reference voltage switch is on, the voltage generation unit may output the reference voltage to charge the storage capacitor, and the reference voltage switch may be turned off while the reference signal changes, and the storage capacitor may apply the reference voltage to the second input unit.

A first current switch connected between the first input unit and the first current circuit, a second current circuit that causes a current corresponding to a current flowing through the first current path to flow through the second current path, a third current circuit that is connected to the first input unit and causes a second current to flow in a direction opposite to the first current, and a second current switch connected between the first input unit and the third current circuit may be further included.

When one of the first and second current switches is turned off, the other may be turned on, when the first current switch is on, the reference signal may decrease substantially linearly with a lapse of time, and when the second current switch is on, the reference signal may rise substantially linearly with a lapse of time.

The output circuit may include a detection transistor having a source connected to the first input unit and the output unit and a gate connected to the second input unit, and a reset switch connected between a drain of the detection transistor and a predetermined voltage source, the first capacitive element may be connected between a source of the detection transistor and a voltage source, and the first current circuit and the offset generation unit may supply the first current and the offset current, respectively, to a source of the detection transistor, or cause the first current and the offset current to flow from a source of the detection transistor.

A solid-state imaging device according to the present disclosure is a solid-state imaging device that generates a reference signal that is compared with an electric signal from a pixel unit in order to perform AD conversion on the electric signal and has a voltage changing with a lapse of time, the solid-state imaging device including a first current circuit that causes a first current to flow, an output circuit including a first input unit connected to the first current circuit, a second input unit that receives a first reference voltage for determining an initial value of the reference signal, and an output unit that outputs the reference signal on the basis of voltages of the first input unit and the second input unit, a first capacitive element that is connected to the first input unit or the output unit and changes the reference signal by accumulating or discharging the first current, a first reference voltage switch provided between a voltage generation unit that generates the first reference voltage and the second input unit, and a first storage capacitor connected between the second input unit and a predetermined voltage source.

The output circuit may further include a third input unit that receives a second reference voltage for shifting an initial value of the reference signal from the first reference voltage, and the solid-state imaging device may further include a second reference voltage switch provided between the voltage generation unit and the third input unit, and a second storage capacitor connected between the third input unit and the voltage source.

The output circuit may be a differential amplifier circuit including a first current path that receives a voltage of the first input unit, a second current path that receives a voltage of the second input unit, a third current path that receives a voltage of the third input unit and is connected in parallel to the second current path, and a detection transistor that amplifies a voltage generated in the second or third current path and outputs the amplified voltage from the output unit, the first capacitive element may be connected between the first input unit and the output unit, the first storage capacitor may set a current flowing through the second current path, and the second storage capacitor may set a current flowing through the third current path.

Before the AD conversion, the first reference voltage switch and the second reference switch may be turned on, and the voltage generation unit may charge the first storage capacitor to the first reference voltage and charge the second storage capacitor to the second reference voltage, and both the first and second reference voltage switches may be maintained to be off during the AD conversion.

The first reference voltage may indicate a voltage level of the reference signal when the first capacitive element is reset, and the second reference voltage may indicate an initial value of the reference signal.

A first current switch connected between the first input unit and the first current circuit, a second current circuit that causes a current corresponding to a current flowing through the first current path to flow through the second or third current path, a third current circuit that is connected to the first input unit and causes a second current to flow in a direction opposite to the first current, and a second current switch connected between the first input unit and the third current circuit may be further included.

The output circuit may include a first detection transistor having a source connected to the first input unit and the output unit and a gate connected to the second input unit, a second detection transistor having a source connected to the first input unit and the output unit and a gate connected to the third input unit, a first reset switch connected between a drain of the first detection transistor and a predetermined voltage source, and a second reset switch connected between a drain of the second detection transistor and the voltage source, the first capacitive element may be connected between the sources of the first and second detection transistors and the voltage source, and the first current circuit may supply the first current to each of the sources of the first and second detection transistors, or causes the first current to flow from each of the sources of the first and second detection transistors.

MODE FOR CARRYING OUT THE INVENTION

Figure 1:
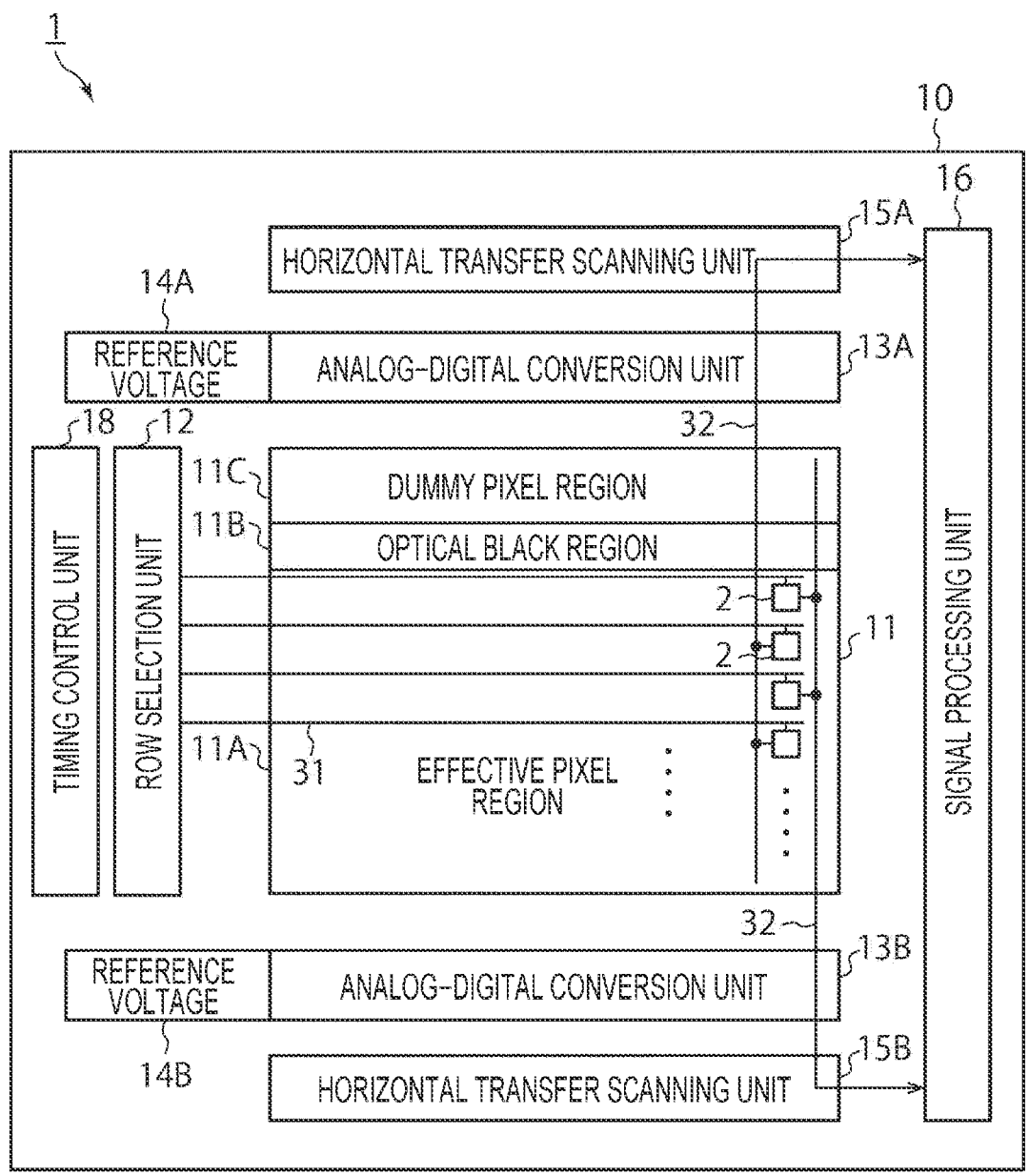
FIG. 1 is a block diagram illustrating a configuration example of a solid-state imaging device according to a first embodiment.

Hereinafter, specific embodiments to which the present technology is applied will be described in detail with reference to the drawings. The drawings are schematic or conceptual, and the ratio of each portion and the like are not necessarily the same as actual ones. In the description and the drawings, elements similar to those described above with respect to previously described drawings are denoted by the same reference numerals, and detailed descriptions thereof are appropriately omitted.

First Embodiment

FIG. 1 is a block diagram illustrating a configuration example of a solid-state imaging device 1 according to a first embodiment. The solid-state imaging device 1 is, for example, a complementary metal oxide semiconductor (CMOS) image sensor manufactured using a CMOS process.

The solid-state imaging device 1 includes a pixel unit 11, a row selection unit 12, ADC units 13A and 13B, reference signal generation units 14A and 14B, horizontal transfer scanning units 15A and 15B, a signal processing unit 16, and a timing control unit 18.

The pixel unit 11 includes a plurality of pixels 2 that photoelectrically converts light to generate an electric signal. The pixels 2 are two-dimensionally arranged in a matrix on the semiconductor substrate 10. Here, a row direction indicates an array direction (for example, in a horizontal direction) of the pixels 2 in a pixel row, and a column direction indicates an array direction (for example, in a vertical direction) of the pixels 2 in a pixel column.

A pixel 2 generates and accumulates photoelectric charges according to the amount of received light by photoelectric conversion. The pixel 2 may be a front surface irradiation type sensor that takes in light from a front surface of the semiconductor substrate 10 on which a wiring layer is formed, or may be a back surface irradiation type sensor that takes in light from a back surface of the semiconductor substrate 10 on an opposite side thereof.

The pixel unit 11 includes an effective pixel region 11A, an optical black (OPB) region 11B, and a dummy pixel region 11C. The effective pixel region 11A is a region in which the pixels 2 used for imaging are arrayed. The OPB region 11B is a region in which light-shielded pixels that output a black-level image are arrayed. The dummy pixel region 11C is a region in which pixels used to set an arbitrary pixel voltage level are arrayed.

In the pixel unit 11, a pixel drive line 31 is wired along the row direction for each pixel row. The pixel drive line 31 transmits a drive signal when reading an electric signal (hereinafter, also referred to as a pixel signal) from the pixel 2. One end of the pixel drive line 31 is connected to the row selection unit 12. The numbers of pixel rows and pixel drive lines 31 are not particularly limited.

In the pixel unit 11, a pair of vertical signal lines 32 is wired along the column direction for each pixel column. The pair of vertical signal lines 32 corresponding to one pixel column is alternately connected to, for example, the pixels 2 in a pixel row of an odd-numbered row and the pixels 2 in an even-numbered row. One of the pair of vertical signal lines 32 is used for reading pixel signals from the pixels 2 arrayed in the odd-numbered row. The other is used for reading pixel signals from the pixels 2 arrayed in the even-numbered row. In this manner, by providing the pair of vertical signal lines 32 for each pixel column, pixel signals can be read out in units of two rows.

The two ADC units 13A and 13B, the two reference signal generation units 14A and 14B, the two horizontal transfer scanning units 15A and 15B, and the like are provided around the pixel unit 11 in the column direction. As described above, by executing AD conversion and the like of the pixel signals in two systems, the processing speed from the AD conversion to output of the imaging frame can be increased, and the frame rate can be improved.

The row selection unit 12 includes a shift register, an address decoder, and the like, and controls scanning of the pixel row and an address of the pixel row when selecting each pixel 2 of the pixel unit 11. Although a specific configuration of the row selection unit 12 is not illustrated, the row selection unit includes a read scanning system and a sweep scanning system.

In order to read a pixel signal from the pixel unit 11, the read scanning system sequentially selectively scans the pixels 2 of the pixel unit 11 row by row. The pixel signal read from the pixel 2 is an analog signal. The sweep scanning system performs sweep scanning on the pixel row, on which read scanning is performed by the read scanning system, prior to the read scanning by a time corresponding to a shutter speed. By the sweep scanning by the sweep scanning system, unnecessary charges are swept out from the pixels 2 in the read row, thereby resetting the pixels 2. Then, by sweeping out (resetting) unnecessary charges by the sweep scanning system, what is called an electronic shutter operation is performed. Here, the electronic shutter operation is an operation of discharging photoelectric charges of a photoelectric conversion unit of the pixel 2 and newly starting exposure (starting accumulation of photoelectric charges).

The ADC units 13A and 13B include a set of a plurality of ADC circuits provided corresponding to the respective vertical signal lines 32, and perform AD conversion on analog pixel signals of two rows output for each pixel column through the vertical signal lines 32 in parallel. More specifically, the ADC unit 13A performs the AD conversion on pixel signals from odd-numbered pixel rows, for example. For example, the ADC unit 13B performs the AD conversion on pixel signals from even-numbered pixel rows. The ADC units 13A and 13B may be, for example, single-slope ADCs using a ramp signal as a reference signal for comparison.

In the single-slope ADC, the ramp signal RAMP in which the voltage value gradually and substantially linearly changes with time is used as the reference signal. In order to generate the ramp signal RAMP, the reference signal generation units 14A and 14B are provided corresponding to the ADC units 13A and 13B. The reference signal generation units 14A and 14B can be configured by, for example, a digital-analog conversion (DAC) circuit.

In the ADC units 13A and 13B, in order to perform the AD conversion under the same condition, the reference signal generation units 14A and 14B have the same configuration and generate substantially the same ramp signal RAMP. The reference signal generation units 14A and 14B may generate substantially the same SAR (successive comparison) signal. Here, "the same configuration" includes not only a case where the configurations are exactly the same but also a case where the configurations are substantially the same, and existence of various variations caused by design or manufacturing is allowed.

Note that, in a case where the ADC units 13A and 13B use the ramp signals RAMP having the same waveform, one reference signal generation unit can be shared between the ADC units 13A and 13B. On the other hand, since the circuit scales of the reference signal generation units 14A and 14B including digital-to-analog (DA) conversion circuits and the like are large, it may be difficult to secure an arrangement space of the reference signal generation units at equal distances from both the ADC units 13A and 13B in the peripheral region of the pixel unit 11. In such a case, the reference signal generation units 14A and 14B may be arranged in the vicinity of each of the ADC units 13A and 13B.

The horizontal transfer scanning units 15A and 15B include a shift register, an address decoder, and the like, and control scanning of the pixel column and an address of the pixel column at the time of reading a signal of each pixel 2 of the pixel unit 11. Moreover, the horizontal transfer scanning units 15A and 15B read the pixel signals converted into digital signals, and output the pixel signals to the signal processing unit 16.

The signal processing unit 16 performs signal processing of rearranging the pixel signals of the odd-numbered rows supplied from the horizontal transfer scanning unit 15A and the pixel signals of the even-numbered rows supplied from the horizontal transfer scanning unit 15B in the order of the pixel rows of a pixel array unit 11. The signal processing unit 16 further performs various types of signal processing such as, for example, amplification processing and arithmetic processing on the pixel signals rearranged in the order of the pixel rows of the pixel array unit 11.

The timing control unit 18 generates various timing signals, clock signals, control signals, and the like, and performs drive control of the row selection unit 12, the ADC units 13A and 13B, the horizontal transfer scanning units 15A and 15B, the signal processing unit 16, a voltage setting unit 17, and the like on the basis of the generated signals.

Note that, in reading the pixel signals, there are two systems of the ADC unit, the horizontal transfer scanning unit, and the like, but the system is not limited to two systems, and may be one system or three or more systems.

Figure 2:
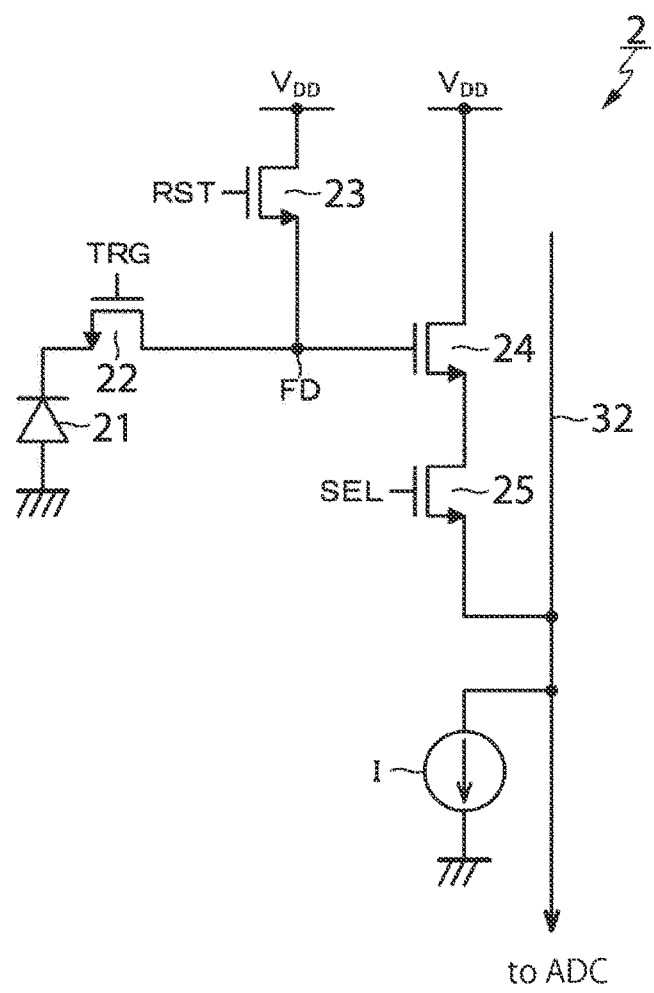
FIG. 2 is a circuit diagram illustrating an example of a circuit configuration of a pixel.

FIG. 2 is a circuit diagram illustrating an example of a circuit configuration of the pixel 2. The pixel 2 includes, for example, a photodiode 21 as the photoelectric conversion unit. The pixel 2 has a pixel configuration including a transfer transistor 22, a reset transistor 23, an amplification transistor 24, and a selection transistor 25 in addition to the photodiode 21.

Note that, for example, N-type metal-oxide-semiconductor field effect transistors (MOSFETs) are used as four transistors of the transfer transistor 22, the reset transistor 23, the amplification transistor 24, and the selection transistor 25. However, the combination of the conductivity types of the four transistors 22 to 25 is merely an example, and is not limited to the combination of them.

The plurality of pixel drive lines 31 illustrated in FIG. 1 is wired in common to the plurality of pixels 2 in the same pixel row. The plurality of pixel drive lines 31 is connected to output ends of the row selection unit 12 corresponding to the respective pixel rows in units of pixel rows. The row selection unit 12 outputs a transfer signal TRG, a reset signal RST, and a selection signal SEL via the plurality of pixel drive lines.

The photodiode 21 has an anode electrode connected to a low-potential-side power supply (for example, ground), photoelectrically converts received light into a photoelectric charge (for example, an electron) of a charge amount corresponding to the amount of light, and accumulates the photoelectric charge. A cathode electrode of the photodiode 21 is electrically connected to a gate electrode of the amplification transistor 24 via the transfer transistor 22. Here, a region where the gate electrode of the amplification transistor 24 is electrically connected is a floating diffusion (floating diffusion region/impurity diffusion region) FD. The floating diffusion FD is a charge-voltage conversion unit that converts a charge into a voltage.

The transfer signal TRG that activates a high-level voltage source (for example, VDD level) is supplied from the row selection unit 12 to a gate electrode of the transfer transistor 22. The transfer transistor 22 becomes a conductive state in response to the transfer signal TRG, thereby transferring the photoelectric charge photoelectrically converted by the photodiode 21 and accumulated in the photodiode 21 to the floating diffusion FD.

The reset transistor 23 is connected between a node of the voltage source VDD and the floating diffusion FD. The reset signal RST that activates a high level voltage is provided from the row selection unit 12 to a gate electrode of the reset transistor 23. The reset transistor 23 becomes a conductive state in response to the reset signal RST, and resets the floating diffusion FD by discarding the charge of the floating diffusion FD to the node.

The amplification transistor 24 has a gate electrode connected to the floating diffusion FD and a drain connected to the node of the voltage source VDD. The amplification transistor 24 serves as an input unit of a source follower that reads a signal obtained by photoelectric conversion in the photodiode 21. That is, a source of the amplification transistor 24 is connected to the vertical signal line 32 via the selection transistor 25. Then, the amplification transistor 24 and a current source I connected to one end of the vertical signal line 32 constitute a source follower that converts the voltage of the floating diffusion FD into the potential of the vertical signal line 32.

The selection transistor 25 has a drain connected to the source of the amplification transistor 24 and a source connected to the vertical signal line 32. The selection signal SEL in which a high level voltage becomes active is supplied from the row selection unit 12 to a gate electrode of the selection transistor 25. The selection transistor 25 becomes a conductive state in response to the selection signal SEL, thereby transmitting the signal output from the amplification transistor 24 to the vertical signal line 32 with the pixel 2 in a selected state.

Note that the selection transistor 25 may have a circuit configuration connected between the node of the voltage source VDD and the drain electrode of the amplification transistor 24. Furthermore, in the present example, a 4Tr configuration including the transfer transistor 22, the reset transistor 23, the amplification transistor 24, and the selection transistor 25, that is, including four transistors (Tr) has been described as an example of the pixel circuit of the pixel 2, but it is not limited to this example. For example, a 3Tr configuration may be employed in which the selection transistor 25 is omitted and the amplification transistor 24 has the function of the selection transistor 25, or a configuration of 5Tr or more may be employed in which the number of transistors is increased as necessary.

Figure 3:
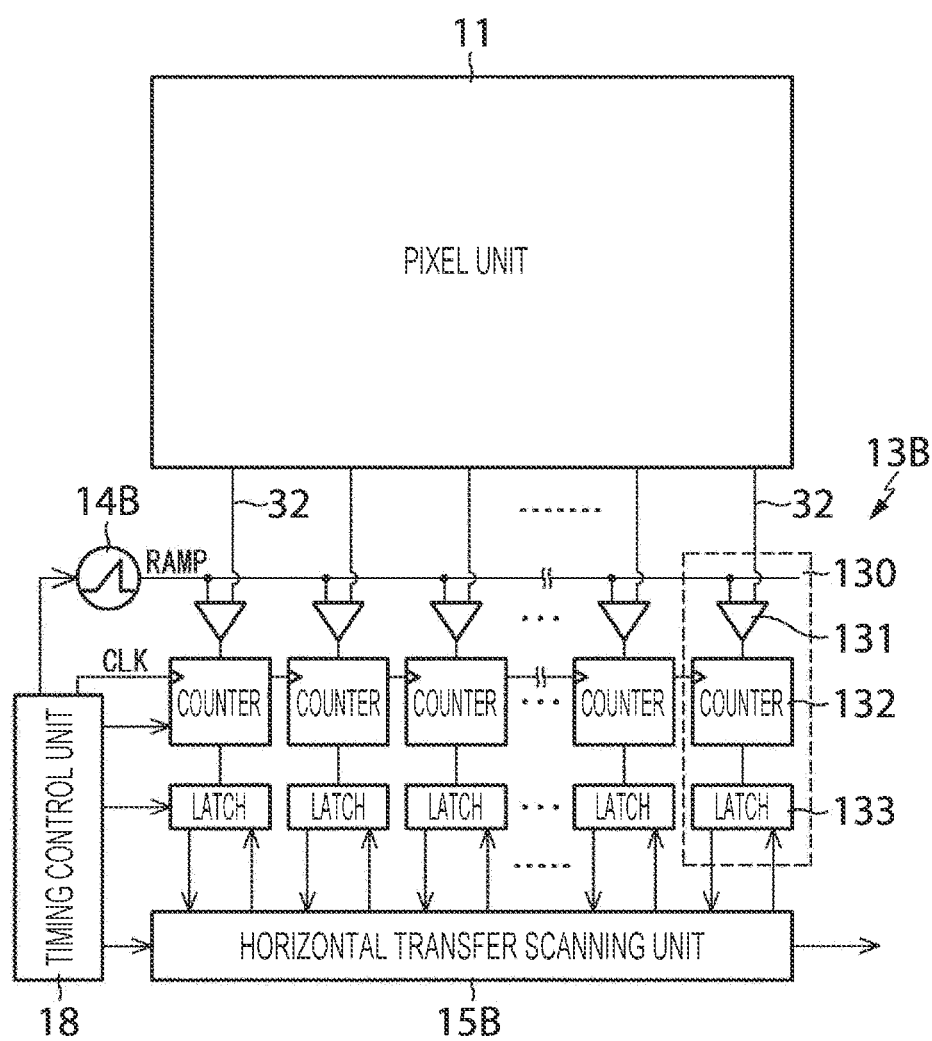
FIG. 3 is a block diagram illustrating a configuration example of an ADC unit and a periphery thereof.

FIG. 3 is a block diagram illustrating configuration examples of the ADC units 13A and 13B and their surroundings. Here, the configuration of one ADC unit 13B is illustrated, but the configuration of the other ADC unit 13A is the same.

The ADC unit 13B includes a set of a plurality of single-slope ADC circuits 130 provided corresponding to the respective vertical signal lines 32.

The ADC circuit 130 includes a comparator 131, a counter circuit 132, and a latch circuit 133. The ADC circuit 130 is supplied with the ramp signal RAMP from the reference signal generation unit 14B.

The comparator 131 receives an input of an analog pixel signal read from the pixel 2 and output through the vertical signal line 32, receives an input of a ramp signal RAMP generated by the reference signal generation unit 14B as a reference signal, and compares voltages of both signals. For example, the comparator 131 outputs a first state (for example, high level) when the ramp signal RAMP is larger than the pixel signal, and outputs a second state (for example, low level) when the ramp signal RAMP becomes equal to or smaller than the pixel signal. Thus, the comparator 131 outputs a pulse signal having a pulse width corresponding to the voltage level of the pixel signal as a comparison result.

The counter circuit 132 receives the clock signal CLK from the timing control unit 18 at the same time as the supply start timing of the ramp signal RAMP to the comparator 131. The counter circuit 132 measures a period (for example, a period from when the output of the comparator 131 enters the first state to when the output enters the second state) of the pulse width of the output pulse of the comparator 131 by performing a counting operation in synchronization with the clock signal CLK. The count result (count value) of the counter circuit 132 is a digital value obtained by digitally converting the analog pixel signal.

The latch circuit 133 holds (latches) the digital value from the counter circuit 132. Furthermore, the latch circuit 133 performs correlated double sampling (CDS) by taking a difference between the count value of the pixel signal (D-phase) at a signal level and the count value of the pixel signal (P-phase) at a reset level. The horizontal transfer scanning unit 15B outputs the digital value held in the latch circuit 133.

In this manner, the ADC unit 13B compares the ramp signal RAMP generated by the reference signal generation unit 14B and linearly changing with the pixel signal output from the pixel 2. Then, the ADC unit 13B counts the time from the start of the change in the ramp signal RAMP until the magnitude relationship between the ramp signal RAMP and the pixel signal is inverted, and outputs the time as a digital value. In this manner, the ADC unit 13B obtains the pixel signal from the pixel unit 11 and performs the AD conversion on the pixel signal. Note that the ADC circuits 130 are provided in one-to-one correspondence with the pixel columns, but may be provided for a plurality of pixel columns.

Figure 4:
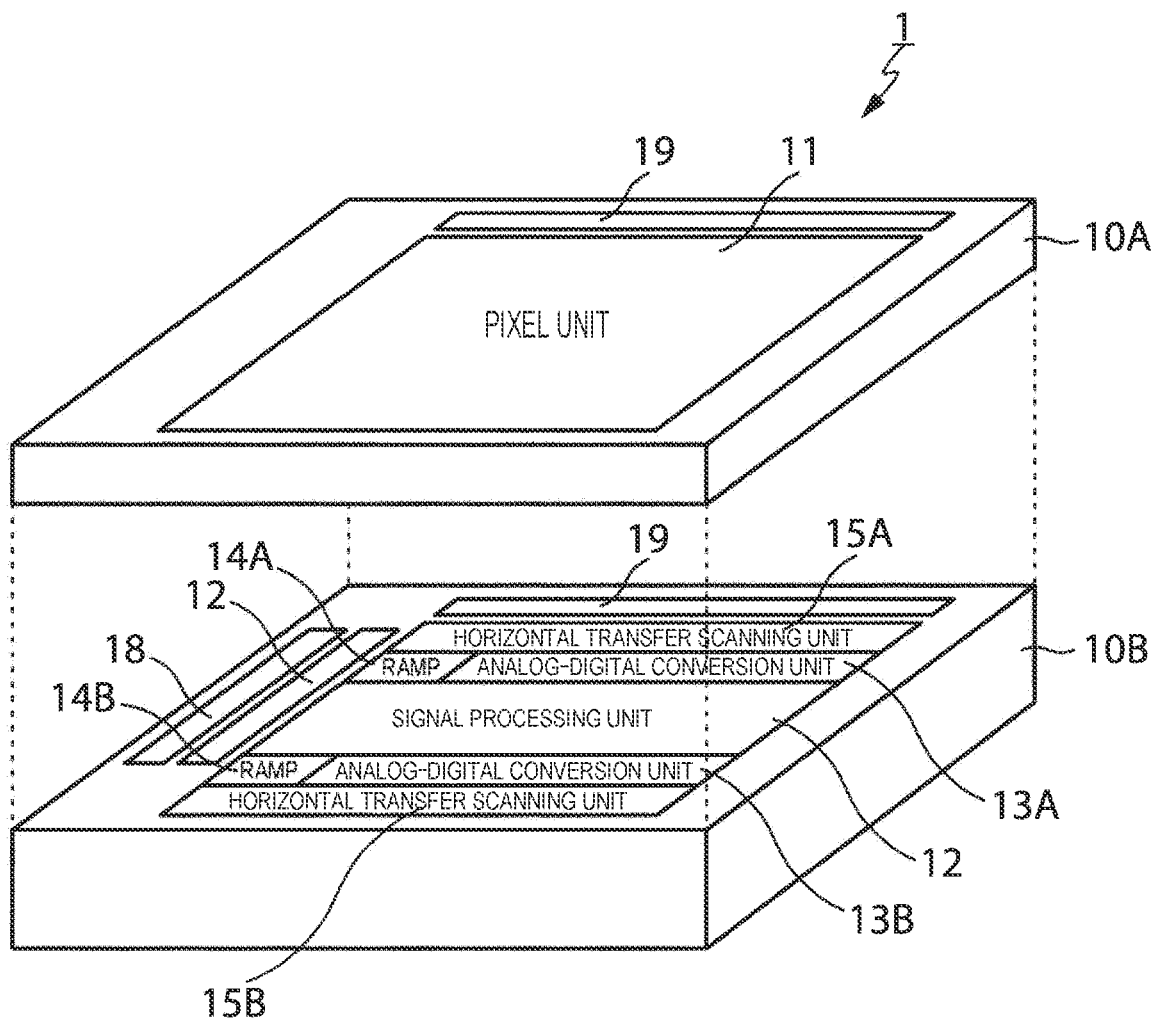
FIG. 4 is a perspective view illustrating an example of a chip structure of the solid-state imaging device according to the present embodiment.

FIG. 4 is a perspective view illustrating an example of a chip structure of the solid-state imaging device 1 according to the present embodiment. The solid-state imaging device 1 may be mounted on one semiconductor chip, or may be mounted on a plurality of stacked semiconductor chips 10A and 10B as illustrated in FIG. 4.

The pixel unit 11 is mounted on the semiconductor chip 10A. In the semiconductor chip 10B, circuit portions such as the row selection unit 12, the ADC units 13A and 13B, the reference signal generation units 14A and 14B, the horizontal transfer scanning units 15A and 15B, the signal processing unit 16, the voltage setting unit 17, and the timing control unit 18 are mounted. The semiconductor chip 10A and the semiconductor chip 10B are electrically connected via a via contact, a Cu—Cu wiring junction, or the like provided in a connection portion 19.

As described above, the solid-state imaging device 1 is divided and mounted on a plurality of stacked semiconductor chips, and thereby the size (area) thereof can be reduced. Furthermore, in the wafer process of the semiconductor chips 10A and 10B, a process suitable for manufacturing the pixel 2 can be applied to the semiconductor chip 10A, and a process suitable for manufacturing other circuit portions can be applied to the semiconductor chip 10B. Therefore, the manufacture of the solid-state imaging device 1 can be optimized.

Note that a part of the circuit of the semiconductor chip 10B may be provided in the semiconductor chip 10A. Furthermore, in FIG. 4, the solid-state imaging device 1 has a stacked structure of two semiconductor chips 10A and 10B, but is not limited thereto, and may have a stacked structure of three or more semiconductor chips.

Figure 5:
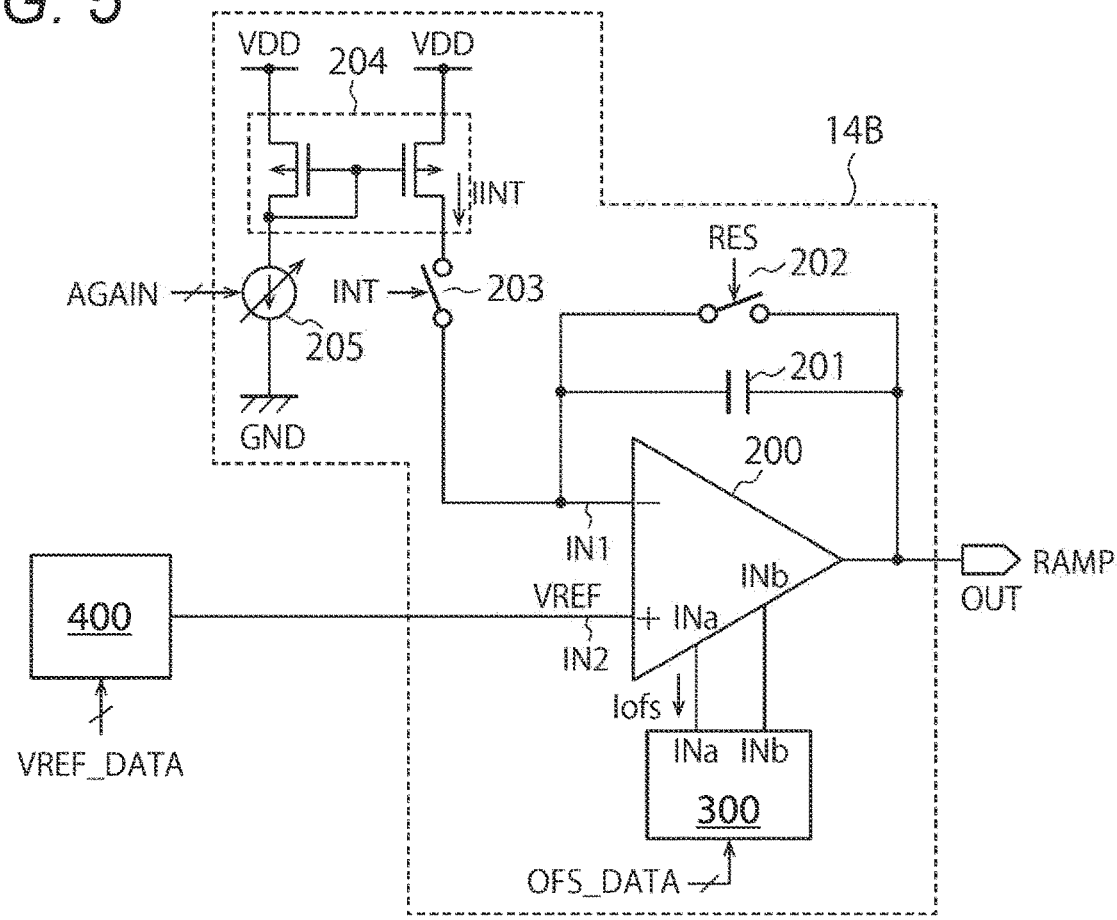
FIG. 5 is a circuit diagram illustrating an example of an internal configuration of a reference signal generation unit.

FIG. 5 is a circuit diagram illustrating an example of an internal configuration of the reference signal generation unit 14B. Note that the configuration of the reference signal generation unit 14A may be the same as the configuration illustrated in FIG. 5. Therefore, the configuration of the reference signal generation unit 14B will be described below, and the description of the reference signal generation unit 14A will be omitted.

The reference signal generation unit 14B as a reference signal control unit includes a differential amplifier circuit 200, an integration capacitor 201, a reset switch 202, an integral current switch 203, a current mirror circuit 204, a current source 205, and an offset generation unit 300. The reference signal generation unit 14B gradually charges (or discharges) the integration capacitor 201 by current supply from the current mirror circuit 204, and changes the voltage of the ramp signal RAMP substantially linearly.

The differential amplifier circuit 200 as an output circuit includes an inverting input terminal IN1, a non-inverting input terminal IN2, and an output terminal OUT. The inverting input terminal IN1 as a first input unit is connected to the current mirror circuit 204 via the switch 203. The current mirror circuit 204 as a first current circuit causes a predetermined integral current IINT to flow as the first current. The inverting input terminal IN1 receives the supply of the integral current IINT from the current mirror circuit 204 when the ramp signal RAMP is generated. The non-inverting input terminal IN2 as a second input unit is connected to a voltage supply unit 400, and receives a ramp reference voltage VREF from the voltage supply unit 400. The ramp reference voltage VREF is a signal that determines an initial value of the ramp signal RAMP before the AD conversion operation. The non-inverting input terminal IN2 is held at the predetermined ramp reference voltage VREF. The output terminal OUT amplifies a difference between the inverting input terminal IN1 and the non-inverting input terminal IN2 and outputs the amplified difference as the ramp signal (reference signal) RAMP.

An integration capacitor 201 and a reset switch 202 are connected between the inverting input terminal IN1 and the output terminal OUT. The integration capacitor 201 and the reset switch 202 are connected in parallel to each other. The reset switch 202 is controlled to be on (conductive state) or off (non-conductive state) by the control signal RES. In the present embodiment, the reset switch 202 is turned on when the control signal RES is at a high level, and the reset switch 202 is turned off when the control signal RES is at a low level. The reset switch 202 may include, for example, an N-type MOSFET.

Before the AD conversion operation of the pixel signal, the control signal RES is at a high level, and the reset switch 202 is turned on. Thus, the inverting input terminal IN1 and the output terminal OUT are short-circuited, and the differential amplifier circuit 200 functions as a voltage follower circuit. Therefore, at this time, the ramp signal RAMP from the output terminal OUT is maintained at the ramp reference voltage VREF. On the other hand, during the AD conversion operation of the pixel signal, the control signal RES is at a low level, and the reset switch 202 is turned off. Thus, the integration capacitor 201 between the inverting input terminal IN1 and the output terminal OUT effectively functions, and the differential amplifier circuit 200 functions as an integration circuit. The integration capacitor 201 as the first capacitive element changes the ramp signal RAMP by accumulating or discharging the constant integral current IINT. Therefore, at this time, the ramp signal RAMP from the output terminal OUT changes substantially linearly with the lapse of time according to the integral current IINT from the current mirror circuit 204.

The integral current switch 203 is connected between the current mirror circuit 204 and the inverting input terminal IN1. The integral current switch 203 is controlled to be on or off by a control signal INT. In the present embodiment, the integral current switch 203 is turned on when the control signal INT is at a high level, and the integral current switch 203 is turned off when the control signal INT is at a low level. The integral current switch 203 may include, for example, an N-type MOSFET.

Before the AD conversion operation of the pixel signal, the control signal INT is at a low level, and the integral current switch 203 is turned off. Thus, the differential amplifier circuit 200 can function as a voltage follower circuit. On the other hand, during the AD conversion operation of the pixel signal, the control signal INT is at a high level, and the integral current switch 203 is turned on. When the integral current switch 203 supplies the integral current IINT to the integration capacitor 201, the differential amplifier circuit 200 can function as an integration circuit.

The current source 205 sets the integral current IINT flowing through the current mirror circuit 204 to a predetermined value. The current value of the current source 205 can be arbitrarily set by a control signal AGAIN. Since the integral current IINT depends on the current value of the current source 205, the slope of the voltage of the ramp signal RAMP can be adjusted by setting the current value of the current source 205.

The offset generation unit 300 is directly connected to current paths (P1 and P2 in FIG. 6) of the differential amplifier circuit 200, and causes an offset current Iofs to flow to the current path P1 or P2 of the differential amplifier circuit 200 during the AD conversion operation of the pixel signal. Thus, the voltage level of the ramp signal RAMP can be offset. A more detailed configuration of the offset generation unit 300 will be described later.

The voltage supply unit 400 is connected to the non-inverting input terminal IN2 of the differential amplifier circuit 200, and supplies the ramp reference voltage VREF based on a control signal VREF_DATA to the non-inverting input terminal IN2.

As described above, the reference signal generation unit 14B generates the ramp signal RAMP that is compared with the pixel signal in the ADC unit 13B and has a voltage changing with the lapse of time. The voltage of the ramp signal RAMP can be shifted by a predetermined offset voltage by the offset generation unit 300.

Note that control signals such as RES, INT, OFS_DATA, VREF_DATA, and AGAIN are generated by the timing control unit 18 and supplied to the reference signal generation unit 14B.

Figure 6:
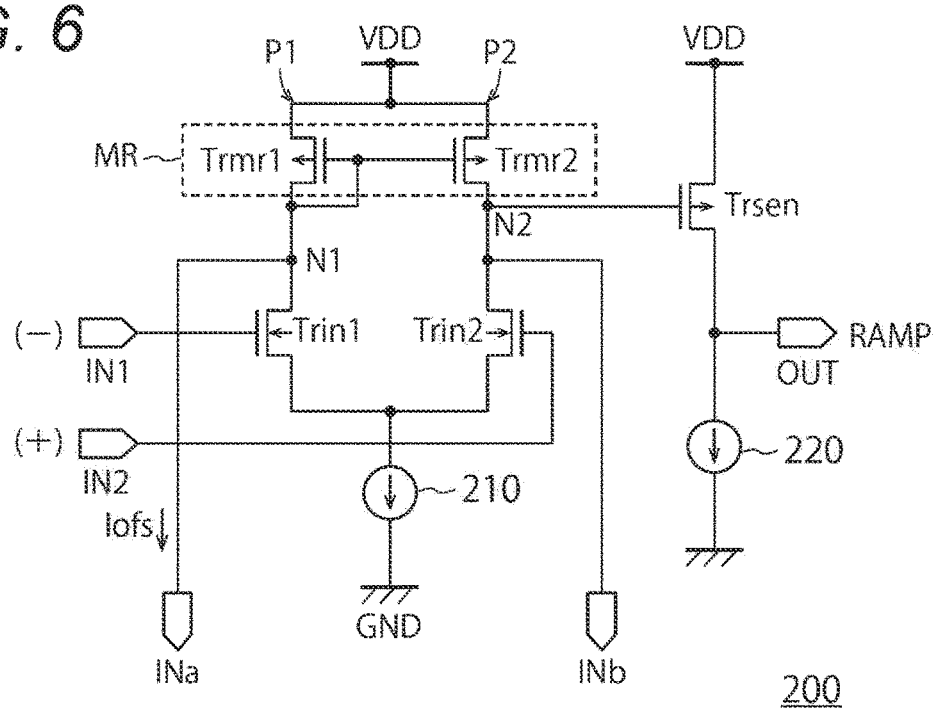
FIG. 6 is a circuit diagram illustrating an example of an internal configuration of a differential amplifier circuit.

FIG. 6 is a circuit diagram illustrating an example of an internal configuration of the differential amplifier circuit 200. The differential amplifier circuit 200 as an output circuit includes input transistors Trin1 and Trin2, mirror transistors Trmr1 and Trmr2, a detection transistor Trsen, current sources 210 and 220, the inverting input terminal IN1, the non-inverting input terminal IN2, and offset input terminals INa and INb.

A drain of the input transistor Tin1 is connected to a drain of the mirror transistor Trmr1, and a source of the input transistor Tin1 is connected to the current source 210. A gate of the input transistor Tin1 is connected to the inverting input terminal IN1.

A drain of the input transistor Tin2 is connected to a drain of the mirror transistor Trmr2, and a source of the input transistor Tin2 is connected to the current source 210. A gate of the input transistor Tin2 is connected to the non-inverting input terminal IN2. Both of the input transistors Tin1 and Tin2 include, for example, N-type MOSFETs.

Sources of the mirror transistors Trmr1 and Trmr2 are connected in common to the high-level voltage source VDD. Gates of the mirror transistors Trmr1 and Trmr2 are connected in common to drains of the mirror transistor Trmr1. The mirror transistors Trmr1 and Trmr2 include, for example, P-type MOSFETs. Thus, the mirror transistors Trmr1 and Trmr2 constitute a current mirror circuit MR. The current mirror circuit MR as a second current circuit causes a current corresponding to the current flowing through the current path P1 to flow through the current path P2. That is, the current mirror circuit MR causes a mirror current obtained by multiplying the current flowing through the current path P1 by a predetermined mirror ratio to flow through the current path P2. For example, the current mirror circuit MR may cause a current substantially equal to the current paths P1 and P2 to flow. The current flowing through the current paths P1 and P2 is set to a predetermined value by the current source 210 except for the offset current Iofs.

Furthermore, the mirror transistor Trmr1 and the input transistor Tin1 constitute a current path P1 as a first current path. The mirror transistor Trmr2 and the input transistor Tin2 constitute a current path P2 as a second current path.

A gate of the detection transistor Trsen is connected to a node N2 between the mirror transistor Trmr2 and the input transistor Tin2. The detection transistor Trsen is connected between the voltage source VDD and the current source 220. An output terminal OUT is connected between the detection transistor Trsen and the current source 220, and the ramp signal RAMP is output.

A voltage corresponding to the state of charge of the integration capacitor 201 is applied to the inverting input terminal IN1. The predetermined ramp reference voltage VREF is applied to the non-inverting input terminal IN2. Thus, the input transistors Tin1 and Tin2 become conductive states corresponding to the voltages of the inverting input terminal IN1 and the non-inverting input terminal IN2, respectively, and generate voltage values corresponding thereto. That is, the current paths P1 and P2 generate voltages corresponding to the voltage difference between the inverting input terminal IN1 and the non-inverting input terminal IN2 by causing substantially equal currents from the current mirror circuit MR to flow. Thus, the voltage of the node N2 becomes a voltage corresponding to the voltage difference between the inverting input terminal IN1 and the non-inverting input terminal IN2.

The detection transistor Trsen becomes a conductive state according to the voltage of the node N2. The current source 220 causes a predetermined current to flow to the detection transistor Trsen. Thus, a voltage obtained by amplifying the voltage difference between the inverting input terminal IN1 and the non-inverting input terminal IN2 is output to the output terminal OUT. In this manner, the detection transistor Trsen amplifies the voltage generated in the current path P2 and outputs the amplified voltage from the output terminal OUT.

Here, the offset generation unit 300 and the offset voltage will be described.

Figure 7:
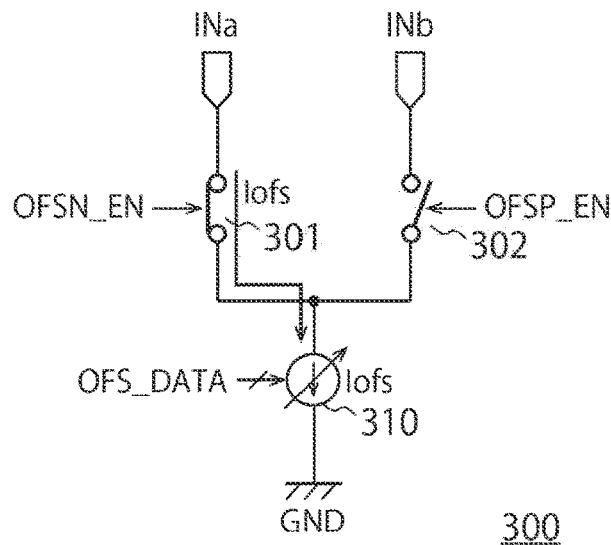
FIG. 7 is a circuit diagram illustrating a configuration example of an offset generation unit.

FIG. 7 is a circuit diagram illustrating a configuration example of the offset generation unit 300. The offset generation unit 300 includes offset switches 301 and 302 and a current source 310.

One end of the offset switch 301 is connected to a node N1 between the current mirror circuit MR of the current path P1 in FIG. 6 and the input transistor Tin1 via the offset input terminal INa. The other end of the offset switch 301 is connected to the current source 310. As described above, the offset switch 301 is connected between the current path P1 and the current source 310, and is controlled to be turned on or off by the control signal OFSN_EN. In the present embodiment, the offset switch 301 is turned on when the control signal OFSN_EN is at a high level, and the offset switch 301 is turned off when the control signal OFSN_EN is at a low level. The offset switch 301 may include, for example, an N-type MOSFET.

One end of the offset switch 302 is connected to the node N2 between the current mirror circuit MR of the current path P2 in FIG. 6 and the input transistor Tin2 via the offset input terminal INb. The other end of the offset switch 302 is connected to the current source 310. As described above, the offset switch 302 is connected between the current path P2 and the current source 310, and is controlled to be turned on or off by the control signal OFSP_EN. In the present embodiment, the offset switch 302 is turned on when the control signal OFSP_EN is at a high level, and the offset switch 302 is turned off when the control signal OFSP_EN is at a low level. The offset switch 302 may include, for example, an N-type MOSFET.

The current source 310 is connected in common to the offset switches 302 and 303 and allows a constant current to flow therethrough. The current source 310 causes a constant current set by the control signal OFS_DATA to flow. For example, in a case where the offset switch 301 is on, the current source 310 causes the offset current Iofs to flow from the node N1 to ground GND. In a case where the offset switch 302 is on, the current source 310 causes the offset current Iofs to flow from the node N2 to the ground GND. When one of the offset switches 301 and 302 is on, the other is off.

In a case where the offset switch 301 is on and the offset switch 302 is off, the predetermined offset current Iofs is extracted from the node N1 of the current path P1. In this case, the current mirror circuit MR causes a relatively large current to flow through the current paths P1 and P2 according to the voltage drop at the node N1. Therefore, the voltage of the node N2 increases, and the voltage of the ramp signal RAMP decreases. On the other hand, in a case where the offset switch 301 is off and the offset switch 302 is on, the predetermined offset current Iofs is extracted from the node N2 of the current path P2. In this case, conversely, the voltage of the node N2 decreases, and the voltage of the ramp signal RAMP increases.

The offset current Iofs is set to a predetermined value according to the control signal OFS_DATA. Therefore, when the offset switch 301 is turned on, the ramp signal RAMP decreases by a predetermined offset voltage. When the offset switch 302 is turned on, the ramp signal RAMP increases by a predetermined offset voltage. In this manner, the offset generation unit 300 can shift the voltage level of the ramp signal RAMP by a predetermined offset voltage Vofs by directly extracting the predetermined offset current Iofs from the current path P1 or P2 of the differential amplifier circuit 200. The magnitude of the offset voltage Vofs is determined by the magnitude of the offset current Iofs. As a result, the offset voltage Vofs can be determined by setting the control signal OFS_DATA. Note that the offset generation unit 300 may supply the predetermined offset current Iofs to the current path P1 or P2 of the differential amplifier circuit 200. In this case, the voltage level of the ramp signal RAMP can be shifted to the opposite polarity by the predetermined offset voltage Vofs.

Note that the control signals OFSN_EN and OFSP_EN are generated by the timing control unit 18 and supplied to the reference signal generation unit 14B.

Next, operation of the solid-state imaging device 1 will be described in more detail.

Figure 8:
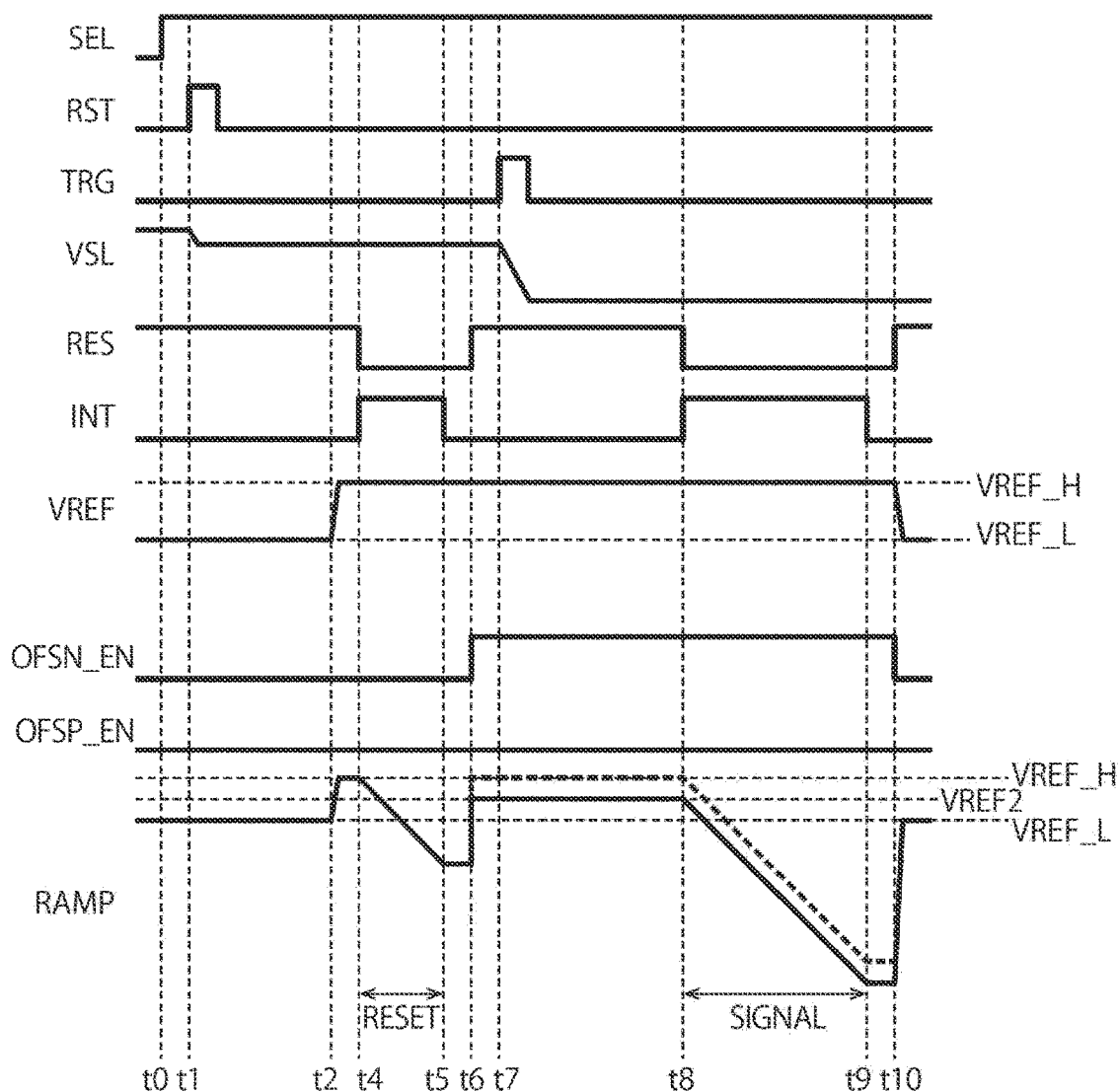
FIG. 8 is a timing chart illustrating an example of operation of the solid-state imaging device according to the first embodiment.

FIG. 8 is a timing chart illustrating an example of operation of the solid-state imaging device 1 according to the first embodiment.

First, before the start of detection of the pixel signal, the control signal RES is at a high level, and the reset switch 202 in FIG. 5 is turned on. The control signal INT is at a low level, and the integral current switch 203 is turned off. Thus, the reference signal generation unit 14B in FIG. 5 is in the reset state, and the differential amplifier circuit 200 functions as a voltage follower circuit. The reference signal generation unit 14B outputs the ramp reference voltage VREF as the ramp signal RAMP. At this time, the ramp reference voltage VREF is at a low level VREF_L, and accordingly, the ramp signal RAMP is also at a low level VREF_L. Furthermore, the control signals OFSN_EN and OFSP_EN are at low levels, and the offset generation unit 300 does not cause the offset current Iofs to flow.

Next, at t0, the timing control unit 18 raises the selection signal SEL of a certain pixel row. Thus, the selection transistors 25 of the pixels included in the selected pixel row are turned on, and these pixels are connected to the corresponding vertical signal lines 32.

Next, at t1, the reset signal RST rises in a pulse shape. Thus, the reset transistor 23 of FIG. 2 eliminates the charge of the floating diffusion FD to the voltage source VDD, thereby resetting the floating diffusion FD. At this time, the pixel signal at the reset level is transmitted to the voltage VSL of the vertical signal line 32.

Next, at t2, the ramp reference voltage VREF rises to a high-level VREF_H. When the offset current Iofs is zero, the ramp reference voltage VREF_H is an initial voltage of the ramp signal RAMP when the AD conversion of the pixel signal is started. In the detection operation of the pixel signal of the AD conversion, the reference signal generation unit 14B starts the ramp signal RAMP from the ramp reference voltage VREF_H and decreases (or increases) the ramp signal substantially linearly. Note that the ramp reference voltage RAMP_H is set to a level higher than the level of the pixel signal.

Next, at t4, the control signal RES is set to a low level to turn off the reset switch 202, and the control signal INT is set to a high level to turn on the integral current switch 203. The integral current IINT flows through the integral current switch 203 to the integration capacitor 201, and the charge is gradually accumulated or discharged. The differential amplifier circuit 200 functions as an integration circuit, and outputs a voltage corresponding to the charge accumulated in the integration capacitor 201 as the ramp signal RAMP.

At this time, in a case where the offset current Iofs is zero, the ramp signal RAMP decreases substantially linearly from the ramp reference voltage VREF_H as described above. From t4 to t5, the ramp signal RAMP decreases substantially linearly.

At t5, when the ramp signal RAMP falls below the pixel signal at the reset level (voltage VSL), the output of the comparator 131 in FIG. 3 is logically inverted. Thus, the counter 132 counts the output pulses of the comparator 131 from t4 to t5, and converts the pixel signal at the reset level into a digital value. This digital value is stored in the latch circuit 133.

When the AD conversion of the reset level is completed at t5, the control signal INT in FIG. 5 falls to a low level, and the integral current switch 203 is turned off. Thus, the flow of the integral current IINT is cut off, and the operation of the ramp signal RAMP is stopped.

Next, at t6, the control signal RES is raised to a high level to reset the integration capacitor 201. Furthermore, the control signal OFSN_EN is raised to a high level, and the offset switch 301 in FIG. 7 is turned on. Thus, the offset current Iofs flows from the node N1 of the current path P1 in FIG. 6 to the ground GND. Therefore, as illustrated in FIG. 8, the ramp signal RAMP becomes a ramp reference voltage VREF2 (VREF2=VREF_H−Vofs) decreased from the ramp reference voltage VREF_H by the offset voltage Vofs. The offset voltage Vofs is set to, for example, a dark current component of the photodiode 21. Thus, the reference signal generation units 14A and 14B can eliminate the dark current component of the photodiode 21 from the ramp signal RAMP by shifting the voltage level of the ramp signal RAMP by the offset voltage Vofs. Note that a broken line of t6 to t10 in FIG. 8 indicates the waveform of the ramp signal RAMP in a case where the offset current Iofs is 0 (there is no offset).

Next, at t7, the transfer signal TRG rises to a high level, and the transfer transistor 22 transfers a signal charge of the photodiode 21 to the floating diffusion FD. Thus, the potential of the floating diffusion FD becomes a potential based on the charge amount accumulated in the photodiode 21. The vertical signal line 32 transmits a pixel signal (voltage VSL) at a signal level according to the potential of the floating diffusion FD.

Next, at t8, the control signal RES is set to a low level again to turn off the reset switch 202, and the control signal INT is set to a high level to turn on the integral current switch 203. The integral current IINT flows to the integration capacitor 201 via the integral current switch 203, and the charge is gradually accumulated. The differential amplifier circuit 200 functions as an integration circuit, and outputs a voltage corresponding to the charge accumulated in the integration capacitor 201 as the ramp signal RAMP.

At this time, the ramp signal RAMP decreases substantially linearly from the ramp reference voltage VREF2 shifted from the ramp reference voltage VREF by the offset voltage Vofs. From t8 to t9, the ramp signal RAMP decreases substantially linearly.

At t9, when the ramp signal RAMP falls below the pixel signal (voltage VSL) at the signal level, the output of the comparator 131 in FIG. 3 is logically inverted. Thus, the counter 132 counts the output pulses of the comparator 131 from t8 to t9, and converts the pixel signal at the signal level into a digital value. This digital value is stored in the latch circuit 133.

When the AD conversion of the signal level is completed at t9, the control signal INT in FIG. 5 falls to a low level, and the integral current switch 203 is turned off. Thus, the flow of the integral current IINT is cut off, and the operation of the ramp signal RAMP is stopped.

Next, at t10, the control signal RES is raised to a high level to reset the integration capacitor 201. Furthermore, the control signal OFSN_EN falls to a low level, and the offset switch 301 in FIG. 7 is turned off. Moreover, the ramp reference voltage VREF is returned to VREF_L. Thus, the differential amplifier circuit 200 functions as a voltage follower circuit, and the ramp signal RAMP returns to the ramp reference voltage VREF_L.

Thereafter, the latch circuit 133 performs CDS by taking a difference between the count value of the pixel signal at the signal level and the count value of the pixel signal at the reset level. The horizontal transfer scanning unit 15B outputs the digital value held in the latch circuit 133.

Subsequently, the solid-state imaging device 1 may execute the AD conversion processing of t0 to t10 for another pixel row.

As described above, according to the present embodiment, the offset generation unit 300 is directly connected to the current paths P1 and P2 of the differential amplifier circuit 200, and extracts a current from the current path P1 or P2 or supplies a current to the current path P1 or P2. Thus, when the AD conversion is performed on the pixel signal at the reset level or the signal level, the ramp signal RAMP can be shifted by the predetermined offset voltage Vofs.

In general, the single-slope ADC offsets the initial value of the ramp signal RAMP at the time of the AD conversion of the reset level or the signal level in order to remove the dark current component of the photodiode 21. In this case, in order to offset the ramp signal RAMP, a voltage supply unit may be connected to the input terminal of the differential amplifier circuit of the ramp signal generation circuit via a capacitor (not illustrated). The voltage supply unit is capable of supplying a plurality of different voltage values to the capacitor via a plurality of switches. In this case, the plurality of switches can switch the voltage value applied from the voltage supply unit to the capacitor. Thus, the offset voltage can be applied from the capacitor to the input terminal to offset the initial voltage of the ramp signal RAMP.

However, since these switches switch the capacitor connected to the input terminal of the differential amplifier circuit, kTC noise (random noise) occurs. Therefore, when the capacitor, the switch, and the voltage supply unit are connected to the input terminal of the differential amplifier circuit of the ramp signal generation circuit, large noise is mixed in the ramp signal RAMP.

On the other hand, in the solid-state imaging device 1 according to the present embodiment, the offset generation unit 300 is directly connected to the current paths P1 and P2 of the differential amplifier circuit 200, and offsets the current in the current path P1 or P2. Thus, it is not necessary to provide the capacitor and the switch in the inverting input terminal IN1 and the non-inverting input terminal IN2. Therefore, since it is not necessary to switch the capacitor, the generation of kTC noise can be suppressed.

Second Embodiment

Figure 9:
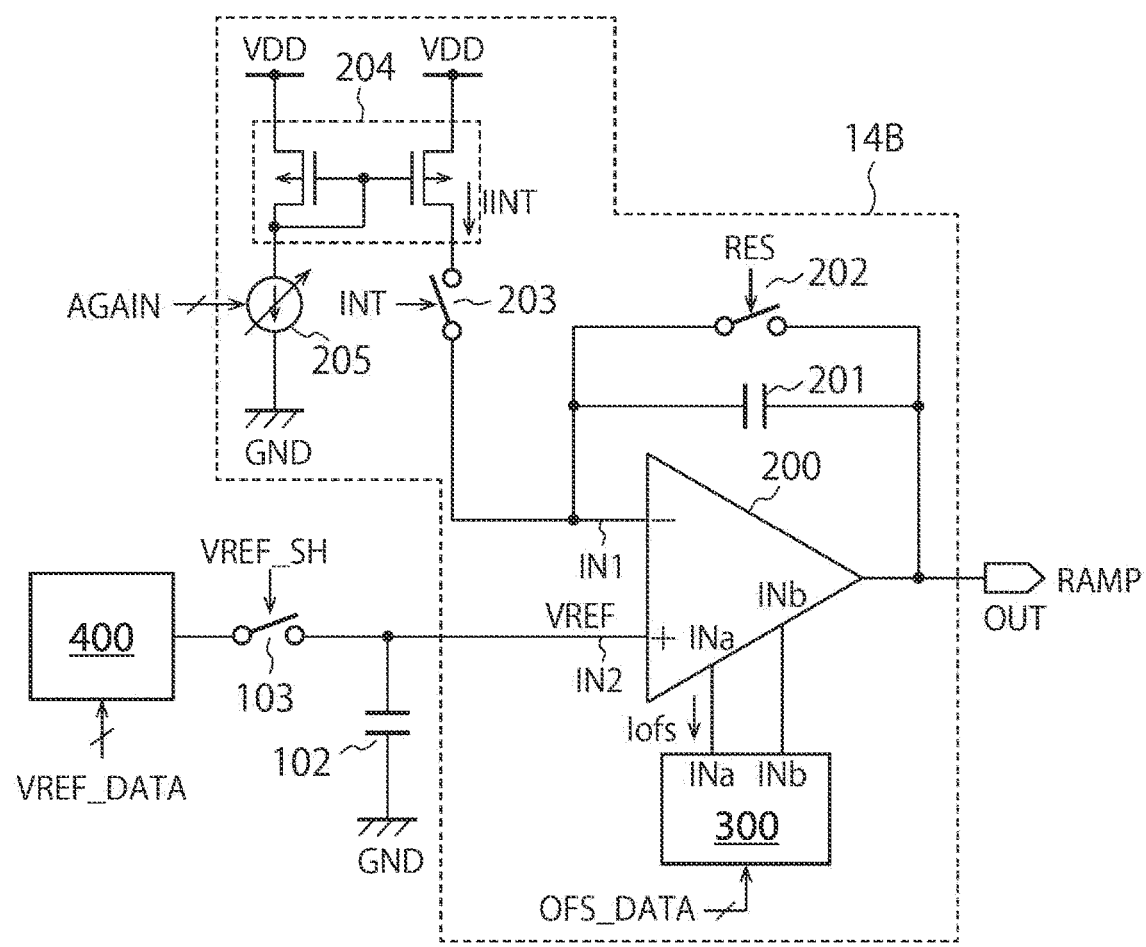
FIG. 9 is a circuit diagram illustrating an example of an internal configuration of a reference signal generation unit according to a second embodiment.

FIG. 9 is a circuit diagram illustrating an example of the internal configuration of the reference signal generation unit 14B according to a second embodiment. Note that the configuration of the reference signal generation unit 14A according to the second embodiment may be the same as the configuration illustrated in FIG. 9. Therefore, the configuration of the reference signal generation unit 14B will be described below, and the description of the reference signal generation unit 14A will be omitted.

The solid-state imaging device 1 according to the second embodiment further includes a reference voltage switch 103 connected between the non-inverting input terminal IN2 and the voltage supply unit 400, and a storage capacitor 102 connected between the non-inverting input terminal IN2 and the ground GND. Other configurations of the second embodiment may be the same as corresponding configurations of the first embodiment.

The reference voltage switch 103 is controlled to be on or off by a control signal VREF_SH. The reference voltage switch 103 switches the connection between the voltage supply unit 400 and the non-inverting input terminal IN2. The reference voltage switch 103 may include, for example, an N-type MOSFET.

The storage capacitor 102 is not interposed between the voltage supply unit 400 and the non-inverting input terminal IN2, but is interposed between the non-inverting input terminal IN2 and the ground GND.

Figure 10:
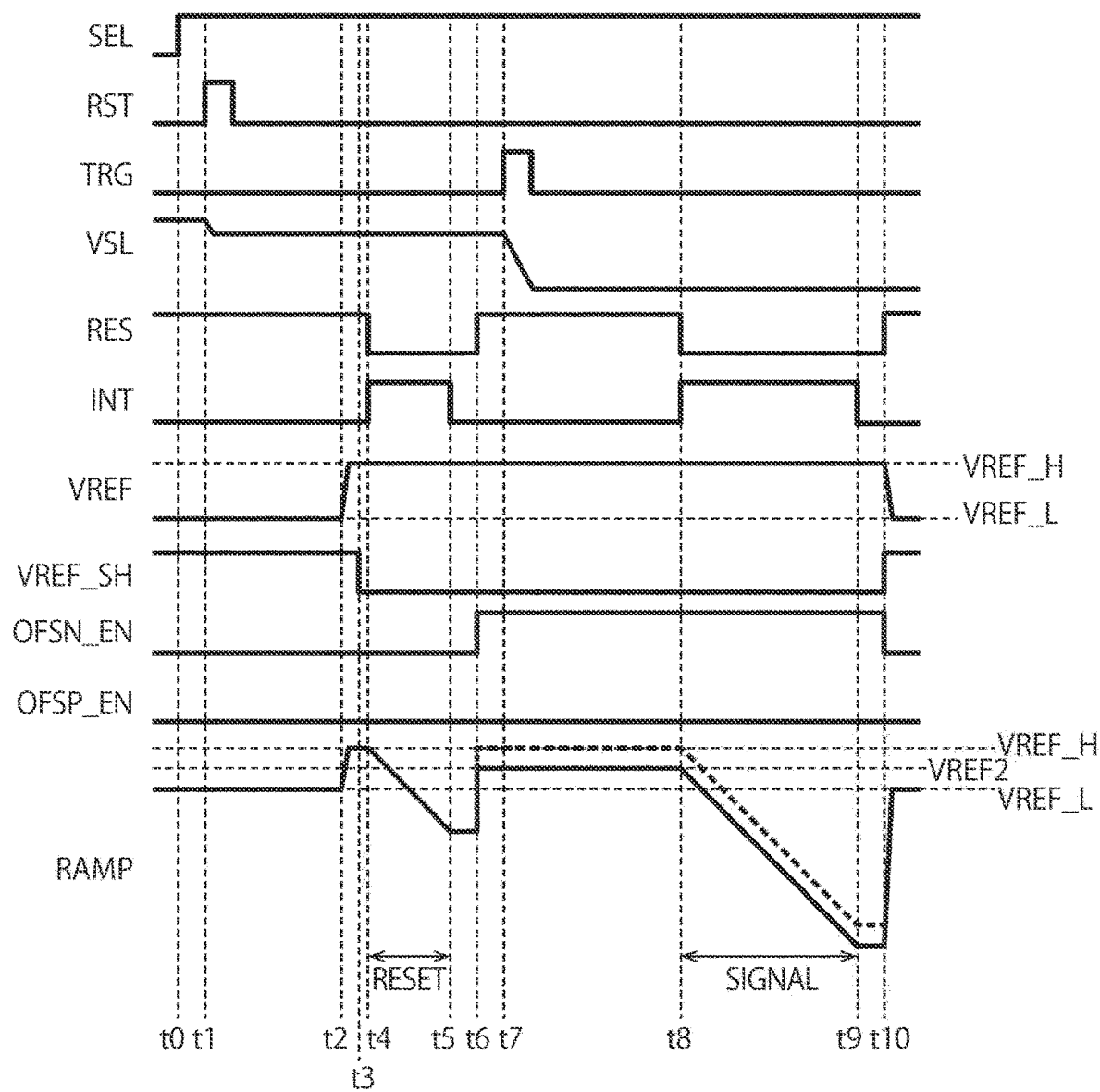
FIG. 10 is a timing chart illustrating an example of operation of a solid-state imaging device according to the second embodiment.

FIG. 10 is a timing chart illustrating an example of operation of the solid-state imaging device 1 according to the second embodiment. The operation of the control signal VREF_SH of the reference voltage switch 103 is added to the timing diagram of FIG. 8.

The control signal VREF_SH is at a high level until t3 immediately before the operation of the ramp signal RAMP is started, and the reference voltage switch 103 is turned on. Thus, the voltage supply unit 400 applies the ramp reference voltage VREF to the non-inverting input terminal IN2 and the storage capacitor 102. From t2 to t3, the voltage supply unit 400 raises the ramp reference voltage VREF from the low level VREF_L to the high level VREF_H. Thus, immediately before the start of the operation of the ramp signal RAMP, the non-inverting input terminal IN2 and the storage capacitor 102 are charged to the ramp reference voltage VREF_H.

At t3 immediately before the start of the operation of the ramp signal RAMP, the control signal VREF_SH falls to a low level, and the reference voltage switch 103 is turned off. Thus, the voltage supply unit 400 is electrically disconnected from the non-inverting input terminal IN2 and the storage capacitor 102. However, during the change of the ramp signal RAMP, the storage capacitor 102 is connected to the non-inverting input terminal IN2, and the ramp reference voltage VREF_H can be continuously applied to the non-inverting input terminal IN2. Therefore, the reference signal generation unit 14B can appropriately linearly change the ramp signal RAMP while being disconnected from the voltage supply unit 400.

Other operations of the second embodiment may be similar to the corresponding operations of the first embodiment.

According to the second embodiment, the reference voltage switch 103 is connected between the non-inverting input terminal IN2 and the voltage supply unit 400, and the reference voltage switch 103 electrically disconnects between the non-inverting input terminal IN2 and the voltage supply unit 400 at the time of the AD conversion of the pixel signal.

When the voltage supply unit 400 is connected to the non-inverting input terminal IN2 of the differential amplifier circuit 200, at the time of the AD conversion of the pixel signal, noise of the voltage supply unit 400 is input to the non-inverting input terminal IN2. In this case, noise of the voltage supply unit 400 is output to the ramp signal RAMP.

On the other hand, in the solid-state imaging device 1 according to the second embodiment, the reference voltage switch 103 electrically disconnects the non-inverting input terminal IN2 and the voltage supply unit 400 at the time of the AD conversion of the pixel signal, so that noise of the voltage supply unit 400 is not input to the non-inverting input terminal IN2. Consequently, it is possible to suppress the noise of the voltage supply unit 400 from being output to the ramp signal RAMP.

Furthermore, the control signal VREF_SH in FIG. 10 falls to a low level at t3 before the start of change in the ramp signal RAMP, and then maintains the low level until t10 when the detection of the reset level and the signal level ends. Accordingly, during the AD conversion of the pixel signal, the logical transition of the reference voltage switch 103 has not occurred, and the kTC noise of the reference voltage switch 103 has not occurred in the storage capacitor 102. Therefore, the solid-state imaging device 1 according to the second embodiment can offset the start potential of the ramp signal RAMP with low noise. Thus, the solid-state imaging device 1 can obtain the pixel signal from which the dark current component has been removed in advance, and can improve the image quality.

Moreover, the storage capacitor 102 is connected to the non-inverting input terminal IN2. Thus, even when the voltage supply unit 400 is disconnected from the non-inverting input terminal IN2, the storage capacitor 102 can maintain the voltage of the non-inverting input terminal IN2 at the ramp reference voltage VREF_H during the change of the ramp signal RAMP. Therefore, the reference signal generation unit 14B can appropriately linearly change the ramp signal RAMP while being disconnected from the voltage supply unit 400.

Third Embodiment

Figure 11:
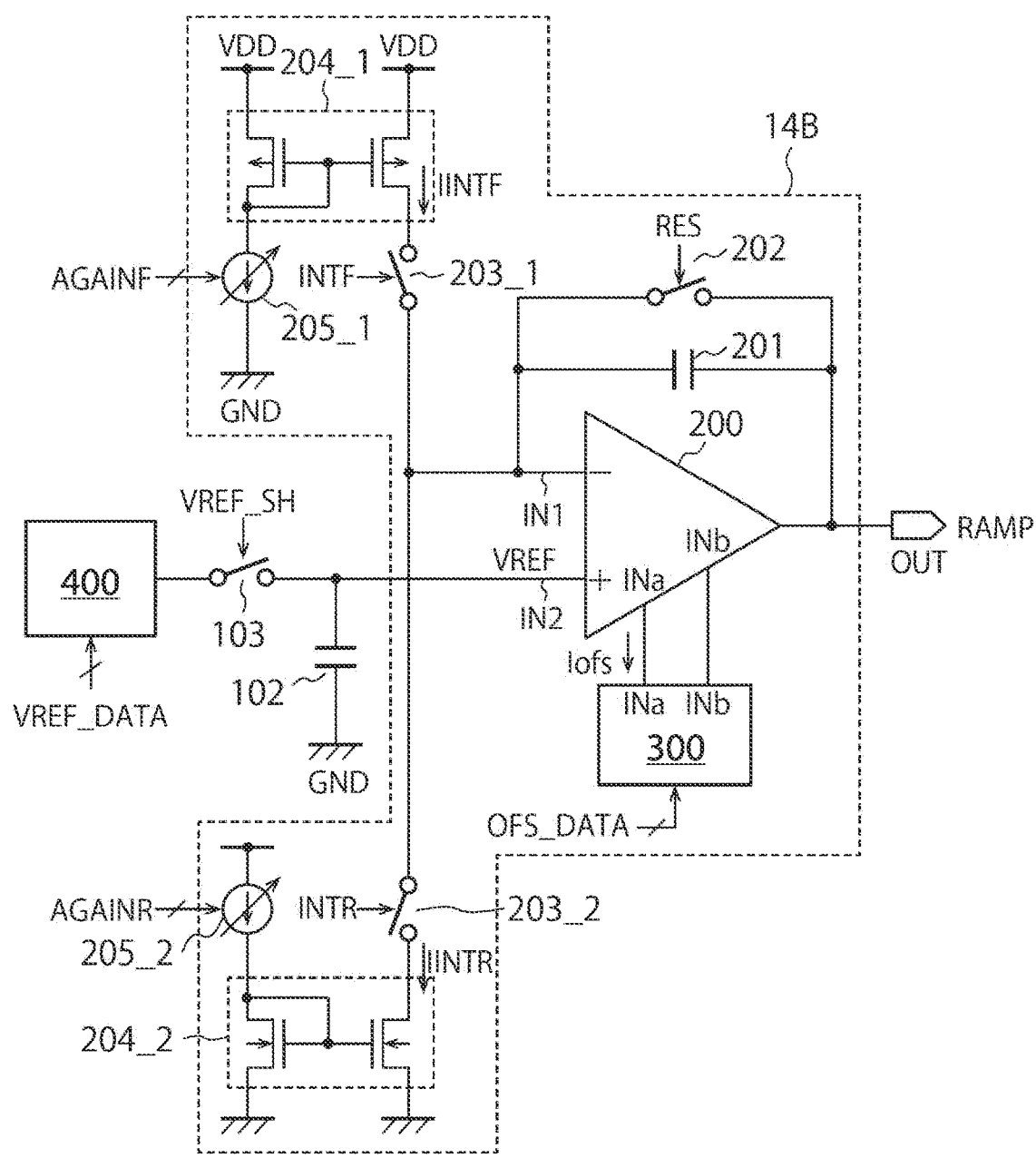
FIG. 11 is a circuit diagram illustrating an example of an internal configuration of a reference signal generation unit according to a third embodiment.

FIG. 11 is a circuit diagram illustrating an example of the internal configuration of the reference signal generation unit 14B according to a third embodiment. Note that the configuration of the reference signal generation unit 14A according to the third embodiment may be the same as the configuration illustrated in FIG. 11. Therefore, the configuration of the reference signal generation unit 14B will be described below, and the description of the reference signal generation unit 14A will be omitted.

In the first and second embodiments, the reference signal generation unit 14B decreases the ramp signal RAMP substantially linearly from the ramp reference voltage VREF_H. On the other hand, in the third embodiment, the reference signal generation unit 14B can selectively lower the ramp signal RAMP substantially linearly from the ramp reference voltage VREF_H or raise the ramp signal RAMP substantially linearly from the ramp reference voltage VREF_L.

For this purpose, the solid-state imaging device 1 according to the third embodiment includes integral current switches 203_1 and 203_2, current mirror circuits 204_1 and 204_2, and current sources 205_1 and 205_2. The integral current switch 203_1, the current mirror circuit 204_1, and the current source 205_1 may have the same configurations as those of the integral current switch 203, the current mirror circuit 204, and the current source 205 of the first or second embodiment. Thus, the integral current switch 203_1, the current mirror circuit 204_1, and the current source 205_1 function to substantially linearly lower the ramp signal RAMP. Note that, for the sake of convenience, the integral current from the current mirror circuit 204_1 is denoted by IINTF, and the control signal of the integral current switch 203_1 is denoted by INTF. Furthermore, the control signal of the current source 205_1 is denoted by AGAINF.

On the other hand, the third embodiment further includes an integral current switch 203_2, a current mirror circuit 204_2, and a current source 205_2. The integral current switch 203_2, the current mirror circuit 204_2, and the current source 205_2 function to raise the ramp signal RAMP substantially linearly. The current mirror circuit 204_2 as a third current circuit causes a predetermined integral current IINTR to flow as the second current. When generating the ramp signal RAMP, the inverting input terminal IN1 receives the supply of the integral current IINTF or IINTR from one of the current mirror circuits 204_1 and 204_2.

The integral current switch 203_2 is connected between the current mirror circuit 204_2 and the inverting input terminal IN1. The integral current switch 203_2 is controlled to be on or off by a control signal INTR. In the present embodiment, the integral current switch 203_2 is turned on when the control signal INTR is at a high level, and the integral current switch 203_2 is turned off when the control signal INT is at a low level. The integral current switch 203_2 may include, for example, an N-type MOSFET.

Before the AD conversion operation of the pixel signal, the control signals INTF and INTR are at a low level, and the integral current switches 203_1 and 203_2 are turned off. Thus, the differential amplifier circuit 200 can function as a voltage follower circuit. On the other hand, during the AD conversion operation of the pixel signal, one of the control signals INTF and INTR selectively rises to a high level, and one of the integral current switches 203_1 and 203_2 is selectively turned on. The differential amplifier circuit 200 functions as an integration circuit by the integral current switch 203_1 supplying the integral current IINTF to the integration capacitor 201 or the integral current switch 203_2 supplying the integral current IINTR to the integration capacitor 201.

For example, in a case where the integral current switch 203_1 is on and the integral current IINTF is supplied to the integration capacitor 201, the differential amplifier circuit 200 decreases the ramp signal RAMP substantially linearly as in the first and second embodiments. For example, in a case where the integral current switch 203_2 is on and the integral current IINTR flows from the integration capacitor 201, the differential amplifier circuit 200 conversely raises the ramp signal RAMP substantially linearly.

The current source 205_2 sets the integral current IINTR flowing to the current mirror circuit 204_2 to a predetermined value. The current value of the current source 205_2 can be arbitrarily set by the control signal AGAINR. Since the integral current IINTR depends on the current value of the current source 205_2, the slope of the voltage of the ramp signal RAMP can be adjusted by setting the current value of the current source 205_2.

Other configurations of the third embodiment may be similar to the corresponding configurations of the first or second embodiment. Note that FIG. 11 illustrates a mode including the reference voltage switch 103 and the storage capacitor 102 of the second embodiment.

Figure 12:
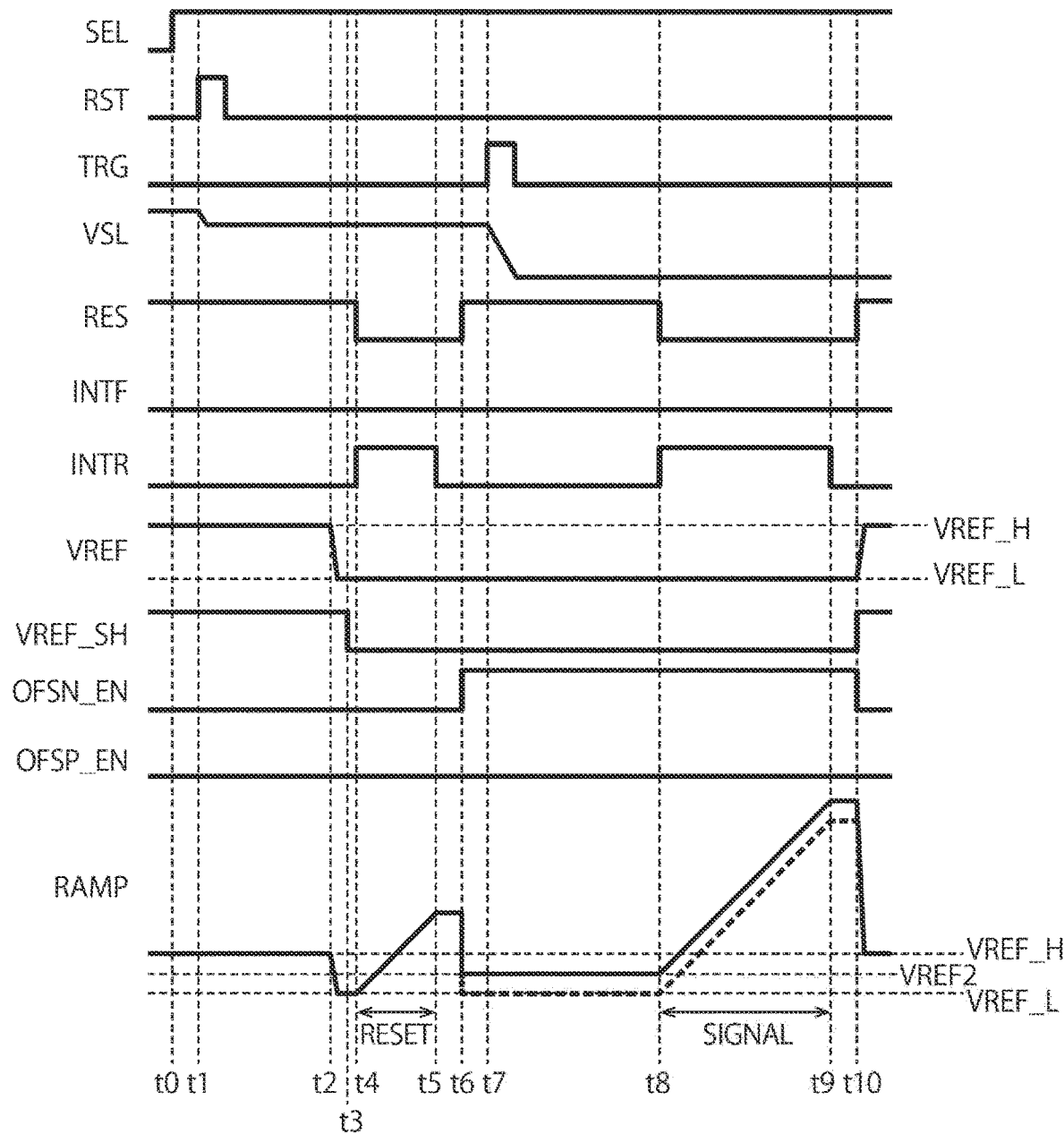
FIG. 12 is a timing chart illustrating an example of operation of a solid-state imaging device according to the third embodiment.

FIG. 12 is a timing chart illustrating an example of operation of the solid-state imaging device 1 according to the third embodiment. FIG. 12 illustrates an example in which the ramp signal RAMP is raised substantially linearly at the time of the AD conversion of the pixel signal. In this case, the control signal INTR rises to a high level, and the integral current switch 203_2 is turned on. The control signal INTF is off, and the integral current switch 203_1 maintains the off state.

Furthermore, the ramp reference voltage VREF falls from the high-level ramp reference voltage VREF_H to the low-level ramp reference voltage VREF_L during the AD conversion. An initial value of the ramp reference voltage VREF is the ramp reference voltage VREF_L.

More specifically, at t2 immediately before the operation of the ramp signal RAMP is started, the ramp reference voltage VREF becomes the ramp reference voltage VREF_L, and the storage capacitor 102 is charged to the ramp reference voltage VREF_L.

Next, at t3, the control signal VREF_SH falls to a low level, and the reference voltage switch 103 is turned off. Thus, the storage capacitor 102 is electrically disconnected from the voltage supply unit 400 in a state of being charged to the ramp reference voltage VREF_L.

Next, at t4, the control signal INTR rises to a high level, and the integral current switch 203_2 is turned on. At this time, the integral current switch 203_1 maintains the off state. The integral current IINTR flows to the integration capacitor 201 via the integral current switch 203_2, and the charge (for example, an electron) is gradually extracted. The differential amplifier circuit 200 functions as an integration circuit, and outputs a voltage corresponding to the charge accumulated in the integration capacitor 201 or the charge extracted from the integration capacitor 201 as the ramp signal RAMP. Therefore, at this time, as indicated by t4 to t5, the ramp signal RAMP rises substantially linearly from the ramp reference voltage VREF_L.

When the AD conversion of the reset level is completed at t5, the control signal INTR falls to a low level, and the integral current switch 203_3 is turned off. Thus, the flow of the integral current IINTR is cut off, and the operation of the ramp signal RAMP is stopped.

Next, at t6, the control signal RES is raised to a high level to reset the integration capacitor 201. Furthermore, the control signal OFSN_EN is raised to a high level, and the offset switch 301 is turned on. Thus, the offset current Iofs flows from the current path P1 to the ground GND. Therefore, the voltage of the ramp signal RAMP becomes the ramp reference voltage VREF2 (VREF+Vofs) increased by the offset voltage Vofs from the ramp reference voltage VREF. Thus, the reference signal generation units 14A and 14B can shift the voltage level of the ramp signal RAMP by the offset voltage Vofs.

A detection operation of the signal level from t8 to t9 substantially linearly increases the ramp signal RAMP basically similarly to the detection operation of the reset level from t4 to t5. At this time, the offset generation unit 300 may shift the voltage level of the ramp signal RAMP by the offset voltage Vofs by causing the predetermined offset current Iofs to flow. For example, the offset generation unit 300 extracts the predetermined offset current Iofs from the offset input terminal INa. Thus, the voltage of the ramp signal RAMP shifts upward by the offset voltage Vofs. Of course, the offset generation unit 300 may shift the voltage of the ramp signal RAMP downward by the offset voltage Vofs by extracting the offset current Iofs from the offset input terminal INb.

FIG. 12 illustrates an example in which the ramp signal RAMP is raised substantially linearly at the time of the AD conversion of the pixel signal. However, at the time of the AD conversion of the pixel signal, the ramp signal RAMP may be lowered substantially linearly as in the first or second embodiment by turning on the integral current switch 203_1 and turning off the integral current switch 203_2.

As described above, in the third embodiment, the ramp signal RAMP can be raised or lowered substantially linearly. Other operations of the third embodiment may be similar to the operations of the first or second embodiment. Therefore, in the third embodiment, similar effects to those of the first or second embodiment can also be obtained.

Fourth Embodiment

Figure 13:
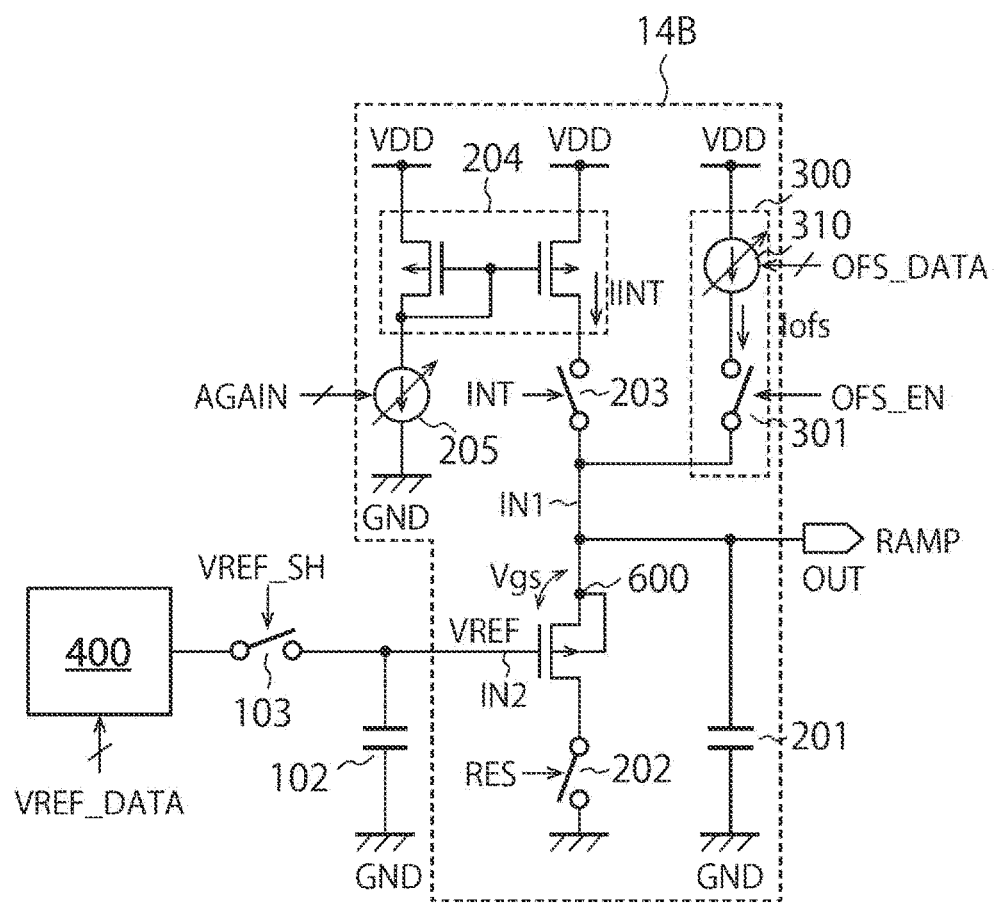
FIG. 13 is a circuit diagram illustrating an example of an internal configuration of a reference signal generation unit according to a fourth embodiment.

FIG. 13 is a circuit diagram illustrating an example of the internal configuration of the reference signal generation unit 14B according to a fourth embodiment. In the fourth embodiment, a detection transistor 600 functioning as a source follower circuit is provided as an output circuit instead of the differential amplifier circuit. A source of the detection transistor 600 is connected to the inverting input terminal IN1 and the output terminal OUT, and a gate thereof is connected to the non-inverting input terminal IN2. For example, a P-type MOSFET is used for the detection transistor 600.

The integration capacitor 201 is connected between the source of the detection transistor 600 and the ground GND. The current mirror circuit 204 and the offset generation unit 300 are connected to the source of the detection transistor 600. The current mirror circuit 204 and the offset generation unit 300 cause the integral current IINT and the offset current Iofs to flow to the integration capacitor 201, respectively.

The storage capacitor 102 and the reference voltage switch 103 are connected to the gate of the detection transistor 600. A drain of the detection transistor 600 is connected to the ground GND via the reset switch 202.

In a case where the reset switch 202 is turned on before the AD conversion of the pixel signal starts, the detection transistor 600 effectively functions as the source follower circuit. In this case, as the voltage of the ramp signal RAMP, a voltage (VREF+Vgs) obtained by adding a gate-source voltage Vgs of the detection transistor 600 to the ramp reference voltage VREF applied from the storage capacitor 102 is output. Thus, the integration capacitor 201 is charged to the ramp reference voltage (VREF+Vgs).

In a case where the reset switch 202 is turned off during the AD conversion of the pixel signal, the detection transistor 600 becomes invalid as the source follower circuit. On the other hand, the integral current switch 203 is turned on, and the integral current IINT is supplied to the integration capacitor 201. Thus, the voltage of the ramp signal RAMP changes substantially linearly.

Here, in a case where the offset switch 301 of the offset generation unit 300 is turned on when the detection transistor 600 functions as the source follower circuit before the AD conversion of the pixel signal is started, the offset voltage Vofs is generated at the inverting input terminal IN1. The offset voltage Vofs is a voltage of the inverting input terminal IN1 generated by causing the offset current Iofs to flow through an output resistor (1/gm) of the detection transistor 600. The voltage of the ramp signal RAMP is shifted from the ramp reference voltage (VREF+Vgs) by the offset voltage Vofs. Note that gm represents transconductance of the detection transistor 600.

Other configurations of the fourth embodiment may be similar to the corresponding configurations of the first or second embodiment. Thus, in the fourth embodiment, the effects of the first or second embodiment can be obtained. Furthermore, in the fourth embodiment, one detection transistor 600 constitutes an output circuit. Therefore, according to the fourth embodiment, the circuit scale of the reference signal generation unit 14B can be reduced.

Figure 14:
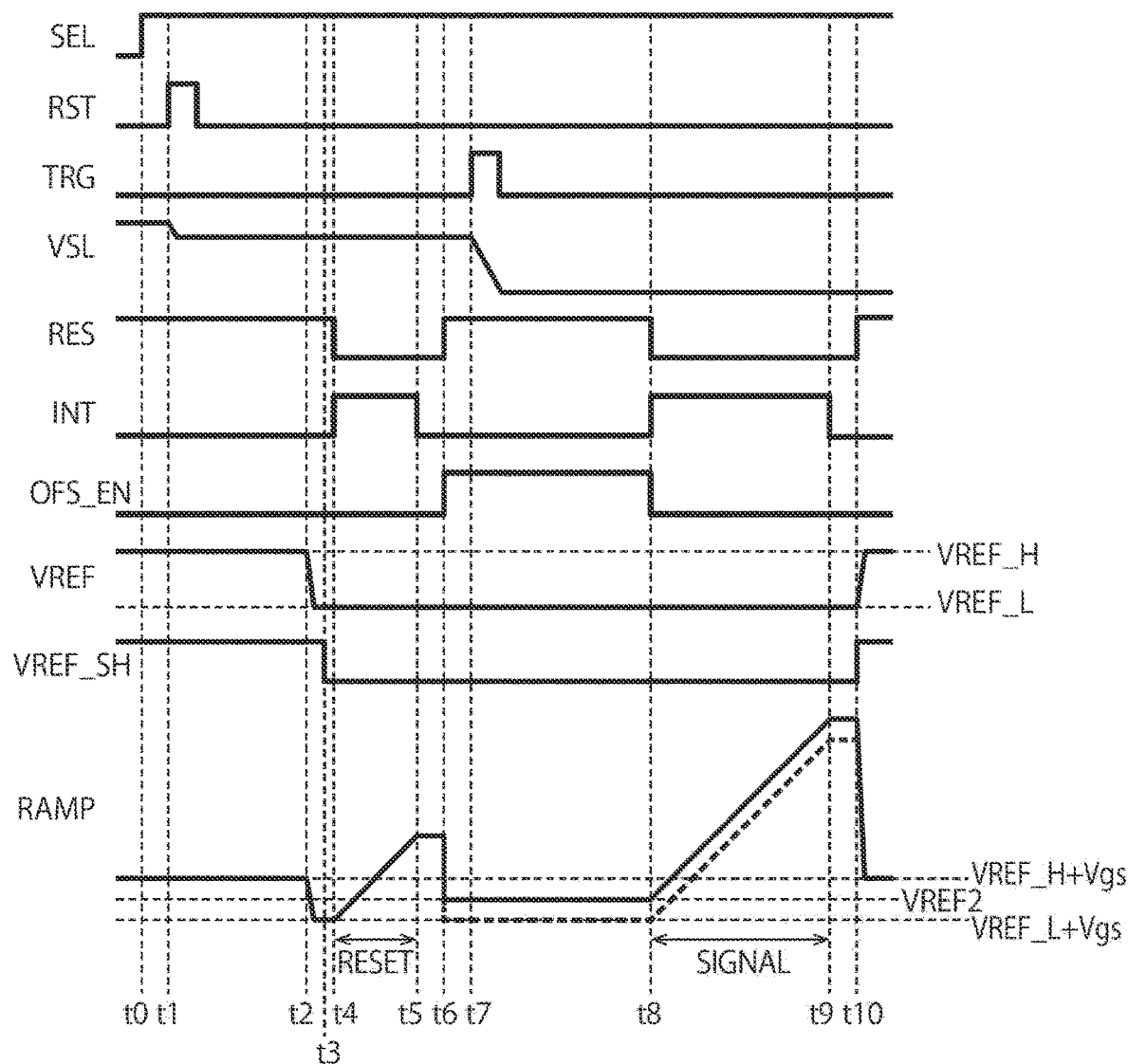
FIG. 14 is a timing chart illustrating an example of operation of a solid-state imaging device 1 according to the fourth embodiment.

FIG. 14 is a timing chart illustrating an example of operation of the solid-state imaging device 1 according to the fourth embodiment. FIG. 14 illustrates an example in which the ramp signal RAMP is raised substantially linearly at the time of the AD conversion of the pixel signal. Furthermore, the ramp reference voltage VREF falls from the high-level ramp reference voltage VREF_H to the low-level ramp reference voltage VREF_L at the time of the AD conversion of the pixel signal. An initial value of the ramp reference voltage VREF is the ramp reference voltage VREF_L.

More specifically, at t2 immediately before the operation of the ramp signal RAMP is started, the ramp reference voltage VREF becomes the ramp reference voltage VREF_L, and the storage capacitor 102 is charged to the ramp reference voltage VREF_L.

Next, at t3, the control signal VREF_SH falls to a low level, and the reference voltage switch 103 is turned off. Thus, the storage capacitor 102 is electrically disconnected from the voltage supply unit 400 in a state of being charged to the ramp reference voltage VREF_L.

Next, at t4, the control signal INT rises to a high level, and the integral current switch 203 is turned on. The integral current IINT flows to the integration capacitor 201 via the integral current switch 203, and the charge (for example, an electron) is gradually extracted. The detection transistor 600 functions as the source follower circuit, and outputs a voltage corresponding to the charge accumulated in the integration capacitor 201 as the ramp signal RAMP. At this time, as indicated by t4 to t5, the ramp signal RAMP rises substantially linearly from the ramp reference voltage VREF_L.

Next, when the AD conversion of the reset level is completed at t5, the control signal INT falls to a low level, and the integral current switch 203 is turned off. Thus, the flow of the integral current IINT is cut off, and the operation of the ramp signal RAMP is stopped.

Next, at t6, the control signal RES is raised to a high level to reset the integration capacitor 201. Furthermore, the control signal OFS_EN is raised to a high level, and the offset switch 301 is turned on. Thus, the offset current Iofs flows to the ground GND via the detection transistor (current path) 600 and the reset switch 202 together with the integral current IINT. Therefore, the voltage of the ramp signal RAMP of the inverting input terminal IN1 (that is, the output terminal OUT) becomes the ramp reference voltage VREF2 (VREF+Vgs+Vofs) increased by the offset voltage Vofs from the ramp reference voltage (VREF+Vgs). Thus, the reference signal generation units 14A and 14B can shift the voltage level of the ramp signal RAMP to the positive side by the offset voltage Vofs.

A detection operation of the signal level from t8 to t9 substantially linearly increases the ramp signal RAMP basically similarly to the detection operation of the reset level from t4 to t5. At this time, at the start of the AD conversion of the pixel signal (t7 to t8), the voltage level of the ramp signal RAMP is shifted to the positive side by the offset voltage Vofs. When the integral current IINT is supplied to the integration capacitor 201 from t8 to t9, the voltage of the ramp signal RAMP increases substantially linearly in a state where the offset voltage Vofs is maintained. Thus, the solid-state imaging device 1 can detect the pixel signal at the signal level excluding the dark current component.

(Modification)

Figure 15:
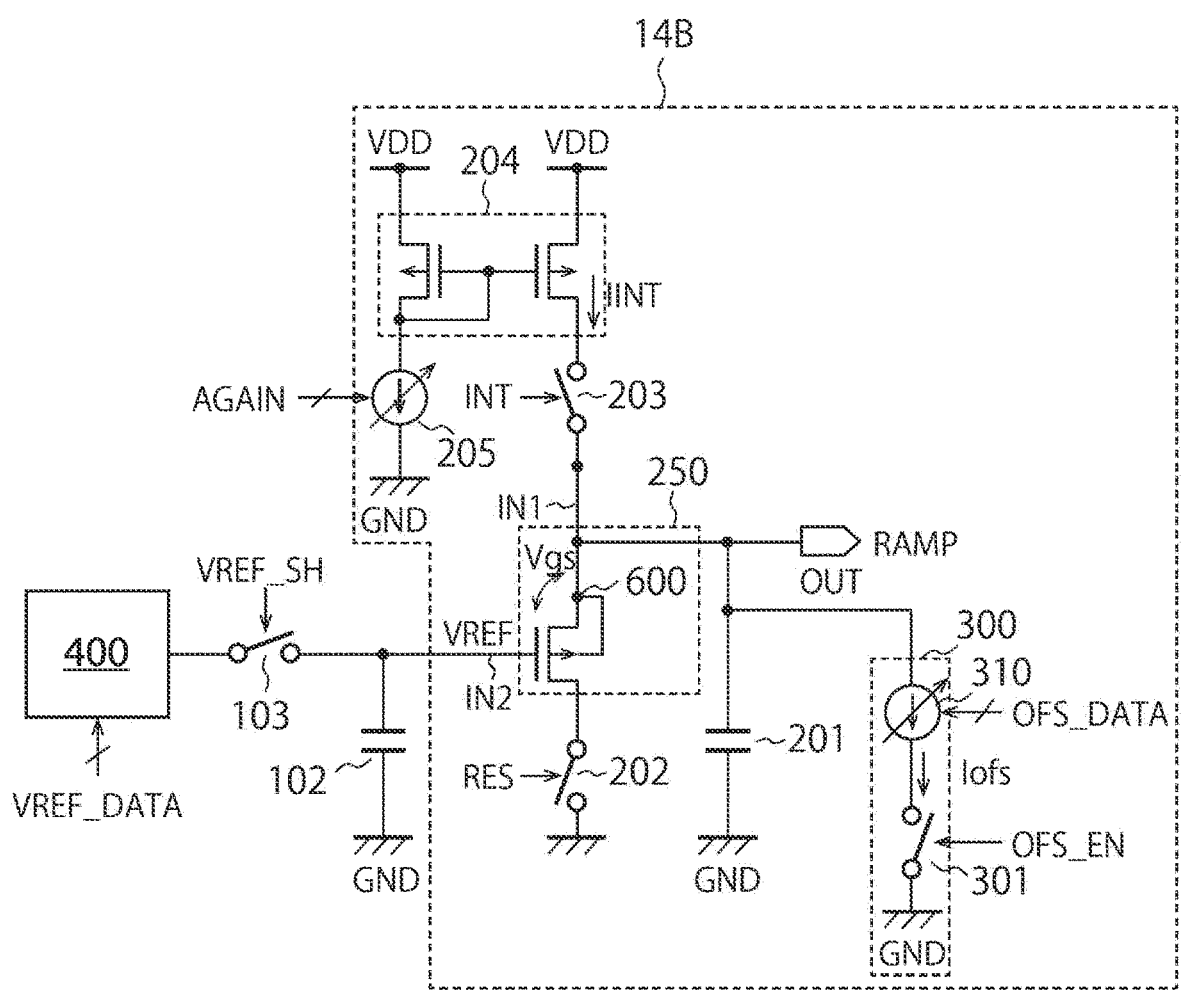
FIG. 15 is a circuit diagram illustrating a configuration example of a solid-state imaging device according to a modification of the fourth embodiment.

FIG. 15 is a circuit diagram illustrating a configuration example of the solid-state imaging device 1 according to a modification of the fourth embodiment. In the present modification, the offset generation unit 300 is connected between the inverting input terminal IN1 and the ground GND, and causes the offset current Iofs to flow from the inverting input terminal IN1 to the ground GND at the time of the AD conversion of the pixel signal. Thus, the offset voltage Vofs can be set to a negative voltage. That is, the ramp signal RAMP can be shifted to the negative side by the offset voltage Vofs.

Note that the reference signal generation unit 14B may include the offset generation unit 300 in either one of FIGS. 13 and 15, or may include the offset generation units 300 in the both. Even in a case where the offset generation units 300 in the both of FIGS. 13 and 15 are provided, one of the offset generation units 300 is driven. Thus, the reference signal generation unit 14B can offset the ramp signal RAMP to both the positive side and the negative side.

Furthermore, although not illustrated, the current mirror circuit 204_2, the integral current switch 203_2, and the current source 205_2 in FIG. 11 may be applied to the embodiment in FIG. 13 or 15. In this case, the reference signal generation unit 14B can lower the ramp signal RAMP substantially linearly or can raise the ramp signal RAMP substantially linearly. That is, by combining the embodiment of FIG. 13 and FIG. 15 with the third embodiment, the effect of the third embodiment can also be obtained.

Fifth Embodiment

Figure 16:
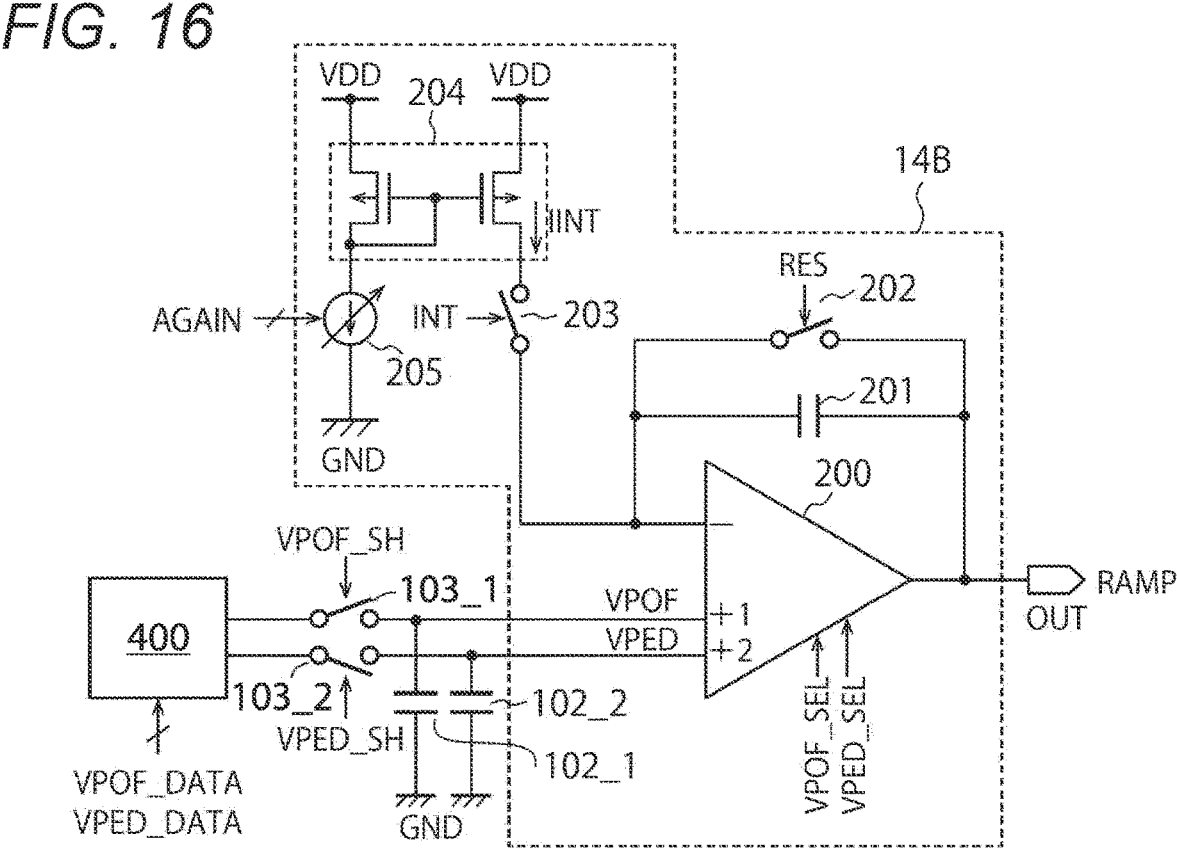
FIG. 16 is a circuit diagram illustrating a configuration example of a solid-state imaging device according to a fifth embodiment.

FIG. 16 is a circuit diagram illustrating a configuration example of the solid-state imaging device 1 according to a fifth embodiment. In the fifth embodiment, the differential amplifier circuit 200 has two non-inverting input terminals IN2_1 and IN2_2. One non-inverting input terminal IN2_1 is provided to set the ramp signal RAMP to a first reference voltage VPOF at an auto zero level before the start of the detection operation of the pixel signal. The other non-inverting input terminal IN2_2 as a third input unit receives a second reference voltage VPED in order to shift the ramp signal RAMP from the first reference voltage VPOF to the second reference voltage VPED as the initial voltage of the ramp signal RAMP.

A reference voltage switch 103_1 is provided between the non-inverting input terminal IN2_1 and the voltage supply unit 400. The storage capacitor 102_1 is connected between the non-inverting input terminal IN2_1 and the ground GND. The reference voltage switch 103_1 is controlled to be on or off by a control signal VPOF_SH. The reference voltage switch 103_1 switches the connection between the voltage supply unit 400 and the non-inverting input terminal IN2_1. The reference voltage switch 103_1 may include, for example, an N-type MOSFET. The storage capacitor 102_1 is not interposed between the voltage supply unit 400 and the non-inverting input terminal IN2_1, but is interposed between the non-inverting input terminal IN2_1 and the ground GND.

A reference voltage switch 103_2 is provided between the non-inverting input terminal IN2_2 and the voltage supply unit 400. The storage capacitor 102_2 is connected between the non-inverting input terminal IN2_2 and the ground GND. The reference voltage switch 103_2 is controlled to be on or off by a control signal VPED_SH. The reference voltage switch 103_2 switches the connection between the voltage supply unit 400 and the non-inverting input terminal IN2_2. The reference voltage switch 103_2 may include, for example, an N-type MOSFET. The storage capacitor 102_2 is not interposed between the voltage supply unit 400 and the non-inverting input terminal IN2_2, but is interposed between the non-inverting input terminal IN2_2 and the ground GND.

The storage capacitor 102_1 receives the first reference voltage VPOF at the auto zero level from the voltage supply unit 400 via the reference voltage switch 103_1, and applies the first reference voltage VPOF to the non-inverting input terminal IN2_1. The storage capacitor 102_2 receives the second reference voltage VPED from the voltage supply unit 400 via the reference voltage switch 103_2 and applies the second reference voltage VPED to the non-inverting input terminal IN2_2.

Figure 17:
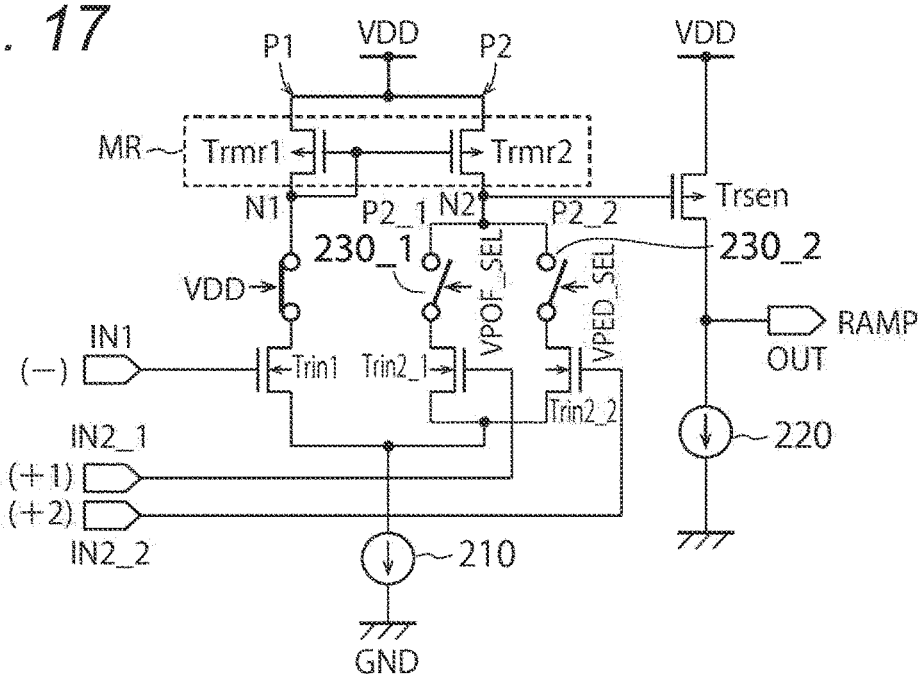
FIG. 17 is a circuit diagram illustrating an example of an internal configuration of a differential amplifier circuit according to a fifth embodiment.

FIG. 17 is a circuit diagram illustrating an example of an internal configuration of the differential amplifier circuit 200 according to a fifth embodiment. In the differential amplifier circuit 200, the current path P2 branches into two current paths P2_1 and P2_2.

The current path P2_1 as the second current path includes an input selection switch 230_1 and an input transistor Trin2_1 connected in series between the node N2 and the current source 210, and is connected to the non-inverting input terminal IN2_1. The input selection switch 230_1 is controlled to be on or off by a control signal VPOF_SEL. A gate of the input transistor Trin2_1 is connected to the non-inverting input terminal IN2_1, and becomes a conductive state according to the first reference voltage VPOF.

A current path P2_2 as a third current path includes an input selection switch 230_2 and an input transistor Trin2_2 connected in series between the node N2 and the current source 210, and is connected to the non-inverting input terminal IN2_2. The current path P2_2 is connected in parallel to the current path P2_1. The input selection switch 230_2 is controlled to be on or off by a control signal VPED_SEL. A gate of the input transistor Trin2_2 is connected to the non-inverting input terminal IN2_2, and becomes a conductive state according to the second reference voltage VPED.

Thus, the current mirror circuit MR causes a current corresponding to the current flowing through the current path P1 to flow through the current path P2_1 or P2_2. Furthermore, the detection transistor Trsen amplifies the voltages generated in the current paths P2_1 and P2_2 and outputs the amplified voltages as the ramp signal RAMP from the output terminal OUT.

Other configurations of the fifth embodiment may be similar to the corresponding configurations of the first or second embodiment. Note that, in the fifth embodiment, the offset generation unit 300 is not provided, but the offset generation unit 300 may be connected to the nodes N1 and N2.

Figure 18:
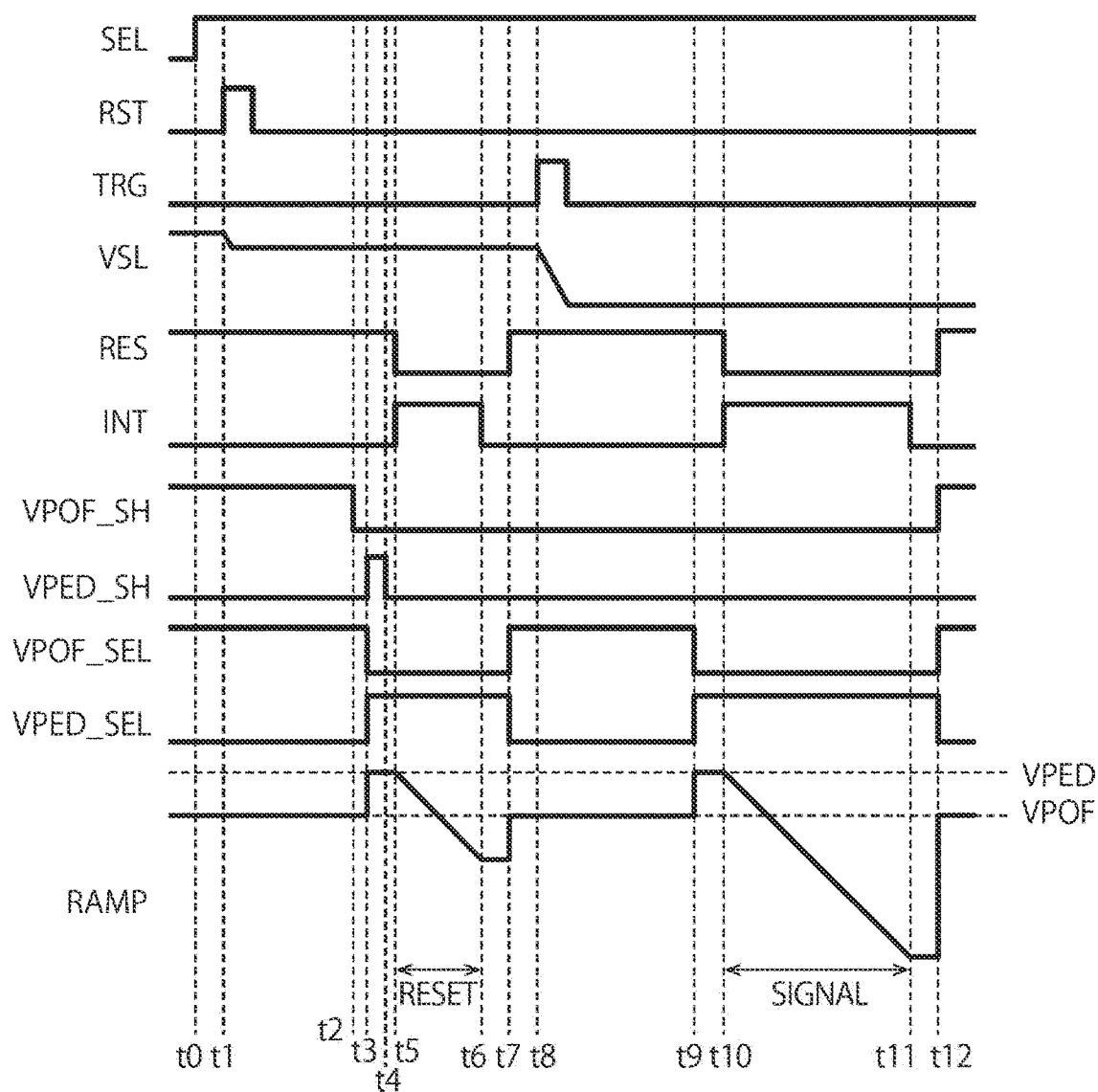
FIG. 18 is a timing chart illustrating an example of operation of the solid-state imaging device according to the fifth embodiment.

FIG. 18 is a timing chart illustrating an example of operation of the solid-state imaging device 1 according to the fifth embodiment. Note that description of the same signal operation as in the first or second embodiment will be omitted as appropriate.

Before detection of the pixel signals from t0 to t2 is started, the control signal VPOF_SH is at a high level, and the reference voltage switch 103_1 is turned on. The voltage supply unit 400 outputs the first reference voltage VPOF and charges the storage capacitor 102_1 to the first reference voltage VPOF.

At this time, the control signal VPOF_SEL is at a high level, and the input selection switch 230_1 is turned on. Thus, the input transistor Trin2_1 becomes a conductive state according to the first reference voltage VPOF. Therefore, the voltage of the ramp signal RAMP becomes the first reference voltage (auto zero level) VPOF.

At t2, when the control signal VPOF_SH falls to a low level, the reference voltage switch 103_1 is turned off. Thus, the non-inverting input terminal IN2_1 and the storage capacitor 102_1 are electrically disconnected from the voltage supply unit 400. However, the storage capacitor 102_1 continues to apply the first reference voltage VPOF to the non-inverting input terminal IN2_1. Therefore, the storage capacitor 102_1 sets the current flowing through the current path P2_1.

Next, at t3, the control signal VPOF_SEL falls to low level, and the input selection switch 230_1 is turned off. Furthermore, the control signal VPED_SH rises to a high level, and the reference voltage switch 103_2 is turned on. The voltage supply unit 400 outputs the second reference voltage VPED and charges the storage capacitor 102_2 to the second reference voltage VPED. Note that the control signal VPED_SH may rise simultaneously with falling of the control signal VPOF_SH. Moreover, the control signals VPOF_SH and VPED_SH may simultaneously rise and simultaneously fall at t3. In this case, the reference voltage switches 103_1 and 103_2 are simultaneously turned on, and the voltage generation unit 400 can simultaneously charge the storage capacitors 102_1 and 102_2 to the first reference voltage VPOF and the second reference voltage VPED, respectively.

Moreover, the control signal VPED_SEL rises to a high level, and the input selection switch 230_2 is turned on. Thus, the input transistor Trin2_2 becomes a conductive state according to the second reference voltage VPED. Therefore, the voltage of the ramp signal RAMP shifts from the reference voltage (auto zero level) VPOF to the second reference voltage VPED. The second reference voltage VPED is the initial value of the ramp signal RAMP at the start of detection of the pixel signal.

Next, at t4, the control signal VPED_SH falls to a low level, and the reference voltage switch 103_2 is turned off. At this point, both the reference voltage switches 103_1 and 103_2 are turned off, and both the non-inverting input terminals IN2_1 and IN2_2 are electrically disconnected from the voltage supply unit 400. However, the storage capacitor 102_2 continues to apply the second reference voltage VPED to the non-inverting input terminal IN2_2. Therefore, the storage capacitor 102_2 sets the current flowing through the current path P2_2. At this time, since the input selection switch 230_1 is turned off, the current flowing through the current path P2_2 becomes the current flowing through the entire current path P2.

Next, at t5, the reset switch 202 is turned off, and the integral current switch 203 is turned on. Thus, detection of the pixel signal is started, and the voltage of the ramp signal RAMP changes substantially linearly with the lapse of time.

Next, when the AD conversion of the reset level is completed at t6, the integral current switch 203 is turned off, and the reset switch 202 is turned on at t7. Thus, the integration capacitor 201 is reset. Furthermore, at t7, the control signal VPED_SEL falls, and the input selection switch 230_2 is turned off. At the same time, the control signal VPOF_SEL rises to a high level, and the input selection switch 230_1 is turned on. Thus, the voltage returns to the first reference voltage (auto zero level) VPOF when the voltage of the ramp signal RAMP is reset. This is because the storage capacitor 102_1 continues to apply the first reference voltage VPOF to the non-inverting input terminal IN2_1 although the voltage supply unit 400 is disconnected from the non-inverting input terminal IN2_1.

Next, at t8, the pixel signal at the signal level is transmitted to the vertical signal line 32, and the voltage VSL thereof becomes the signal level.

Next, at t9, similarly to t3, the input selection switch 230_1 is turned off, and the input selection switch 230_2 is turned on. Thus, the voltage of the ramp signal RAMP is shifted to the second reference voltage VPED. This is because the storage capacitor 102_2 continues to apply the second reference voltage VPED to the non-inverting input terminal IN2_2 although the voltage supply unit 400 is disconnected from the non-inverting input terminal IN2_2.

Next, at t10, similarly to t5, the reset switch 202 is turned off, and the integral current switch 203 is turned on. Thus, detection of the pixel signal is started, and the voltage of the ramp signal RAMP changes substantially linearly with the lapse of time.

Next, when the AD conversion of the signal level is completed at t11, the integral current switch 203 is turned off, and the reset switch 202 is turned on at t7. Other operations of the fifth embodiment may be similar to the corresponding operations of the first or second embodiment.

According to the fifth embodiment, the reference voltage switches 103_1 and 103_2 charge the storage capacitors 102_1 and 102_2 to the reference voltages VPOF and VPED, respectively, before the AD conversion of the pixel signal starts, and then turn off. Thereafter, both the reference voltage switches 103_1 and 103_2 maintain to be off and are not turned on until the detection of the pixel signals at the reset level and the signal level is completed. Accordingly, the reference signal generation unit 14B detects the pixel signal in a state where the voltage supply unit 400 is disconnected from the non-inverting input terminals IN2_1 and IN2_2, and executes the AD conversion of the pixel signal. Therefore, it is possible to suppress noise from the voltage supply unit 400 from being mixed in the ramp signal RAMP.

Furthermore, the reference voltage switches 103_1 and 103_2 maintain an off state from the start of detection of the pixel signal at the reset level to the end of detection of the pixel signal at the signal level, and do not perform switching. Thus, kTC noise due to switching of the reference voltage switches 103_1 and 103_2 is not generated in the storage capacitors 102_1 and 102_2 and is not mixed in the ramp signal RAMP. Therefore, noise mixed in the ramp signal RAMP can be suppressed to be low. Consequently, the solid-state imaging device 1 can improve the image quality.

The offset generation unit 300 of the first embodiment may be applied to the fifth embodiment. In this case, the offset input terminals INa and INb of the offset generation unit 300 are only required to be connected to the nodes N1 and N2 in FIG. 17. Thus, in the fifth embodiment, the ramp signal RAMP can be shifted by the offset voltage Vofs as in the first embodiment.

(Modification)

Figure 19:
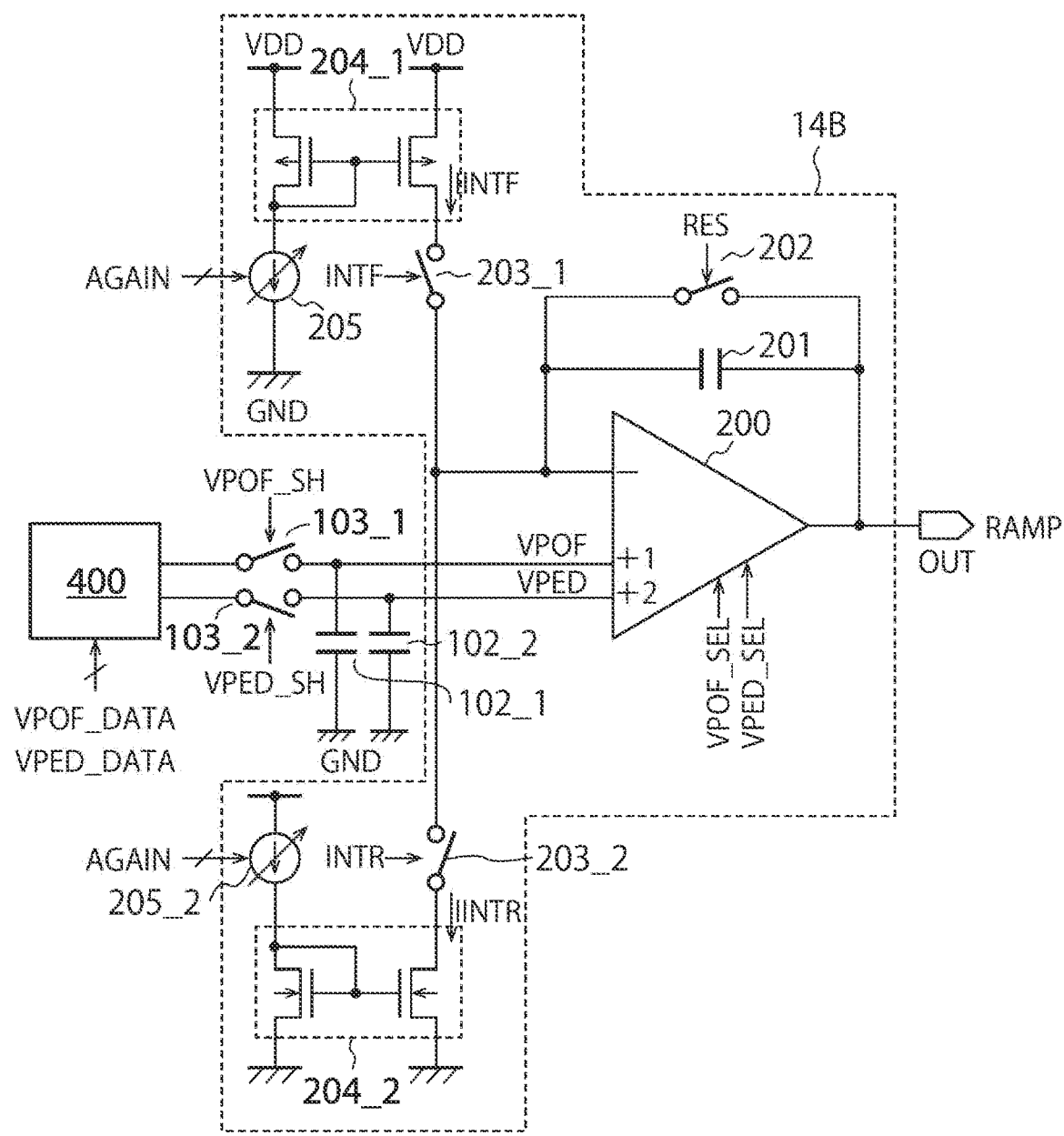
FIG. 19 is a diagram illustrating a modification in which a current mirror circuit of the third embodiment is combined with the fifth embodiment.

The fifth embodiment may be combined with the third or fourth embodiment. For example, FIG. 19 is a diagram illustrating a modification in which the current mirror circuit 204_2 of the third embodiment is combined with the fifth embodiment. In the modification of FIG. 19, an integral current switch 203_2, a current mirror circuit 204_2, and a current source 205_2 are further added to the reference signal generation unit 14B of the fifth embodiment. The integral current switch 203_2, the current mirror circuit 204_2, and the current source 205_2 function to raise the ramp signal RAMP substantially linearly. Thus, in the modification of FIG. 19, the effects of both the third and fifth embodiments can be obtained.

Although the offset generation unit is not illustrated in FIG. 19, the offset generation unit 300 of the first embodiment may be applied to the present modification. In this case, the offset input terminals INa and INb of the offset generation unit 300 are only required to be connected to the nodes N1 and N2 in FIG. 17. Thus, also in the present modification, the ramp signal RAMP can also be shifted by the offset voltage Vofs as in the first embodiment.

Figure 20:
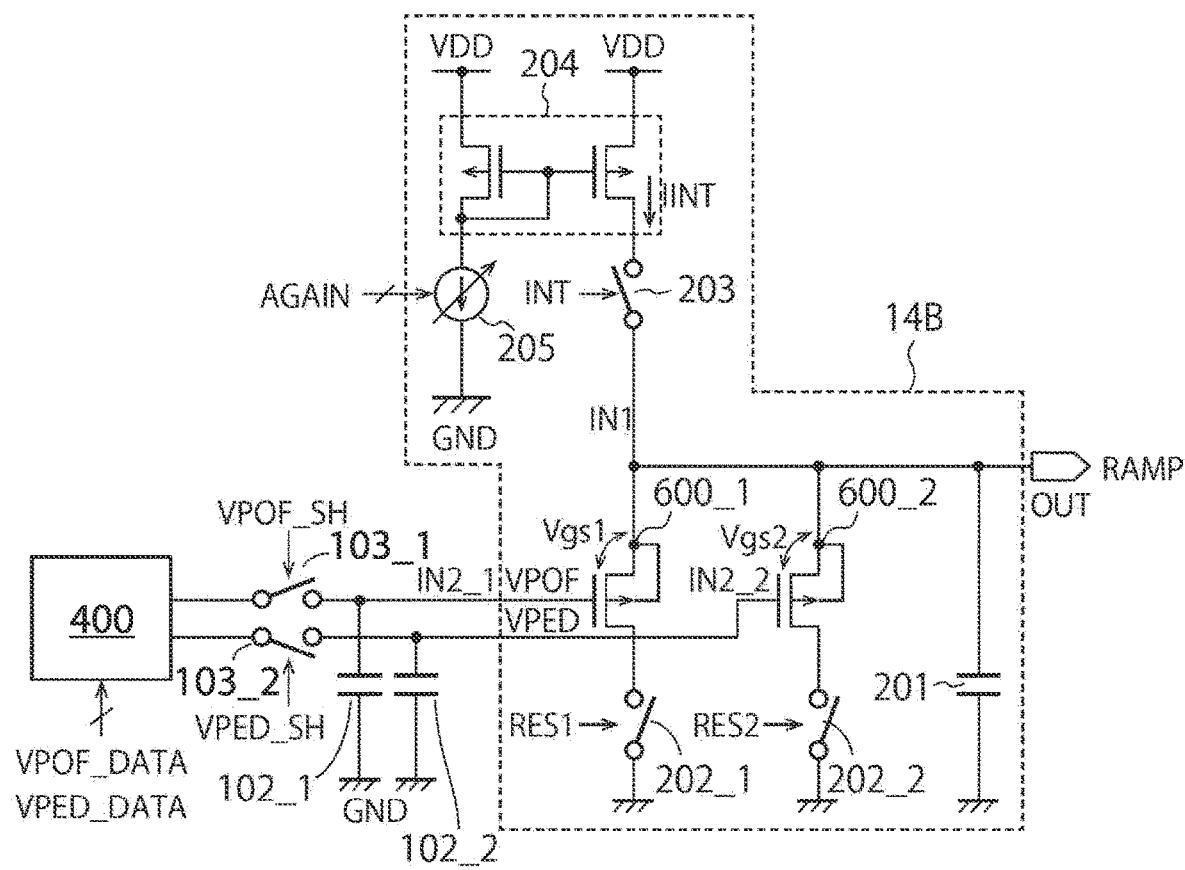
FIG. 20 is a diagram illustrating a modification in which the source follower circuit of the fourth embodiment is combined with the fifth embodiment.

FIG. 20 is a diagram illustrating a modification in which the source follower circuit (600_1 and 600_2) of the fourth embodiment is combined with the fifth embodiment. In the modification of FIG. 20, detection transistors 600_1 and 600_2 as the source follower circuit and reset switches 202_1 and 202_2 are further added to the reference signal generation unit 14B of the fifth embodiment.

The storage capacitor 102_1 and the reference voltage switch 103_1 are connected to a gate of the detection transistor 600_1. A drain of the detection transistor 600_1 is connected to the ground GND via the reset switch 202_1.

The storage capacitor 102_2 and the reference voltage switch 103_2 are connected to a gate of the detection transistor 600_2. A drain of the detection transistor 600_2 is connected to the ground GND via the reset switch 202_2.

The detection transistors 600_1 and 600_2 and the reset switches 202_1 and 202_2 may have the same configuration as the detection transistor 600 and the reset switch 202 of the fourth embodiment, respectively.

Thus, in a case where the reset switch 202_1 is turned on before the start of the AD conversion, the detection transistor 600_1 effectively functions as the source follower circuit. In this case, a voltage (VPOF+Vgs1) obtained by adding the gate-source voltage Vgs1 of the detection transistor 600_1 to the first reference voltage VPOF is output as the voltage of the ramp signal RAMP. Thus, the integration capacitor 201 is charged to the voltage (VPOF+Vgs1).

Moreover, when the reset switch 202_1 is turned off and the reset switch 202_2 is turned on, the detection transistor 600_2 effectively functions as the source follower circuit. In this case, the voltage of the ramp signal RAMP shifts to a voltage (VPED+Vgs2) obtained by adding a gate-source voltage Vgs2 of the detection transistor 600_2 to the second reference voltage VPED.

In a case where the reset switches 202_1 and 202_2 are turned off during the AD conversion of the pixel signal, the detection transistors 600_1 and 600_2 are disabled as the source follower circuit. On the other hand, the integral current switch 203 is turned on, and the integral current IINT is supplied to the integration capacitor 201. Thus, the voltage of the ramp signal RAMP changes substantially linearly.

Although the offset generation unit is not illustrated in FIG. 20, the offset generation unit 300 of the fourth embodiment may be applied to the present modification. In this case, the offset generation unit 300 is only required to be connected to the node N1 of FIG. 20. Thus, also in the present modification, the ramp signal RAMP can also be shifted by the offset voltage Vofs as in the fourth embodiment.

Other configurations of the present modification may be similar to the corresponding configurations of the fourth embodiment. Thus, in the present modification, the effects of the fourth embodiment can be obtained.

Figure 21:
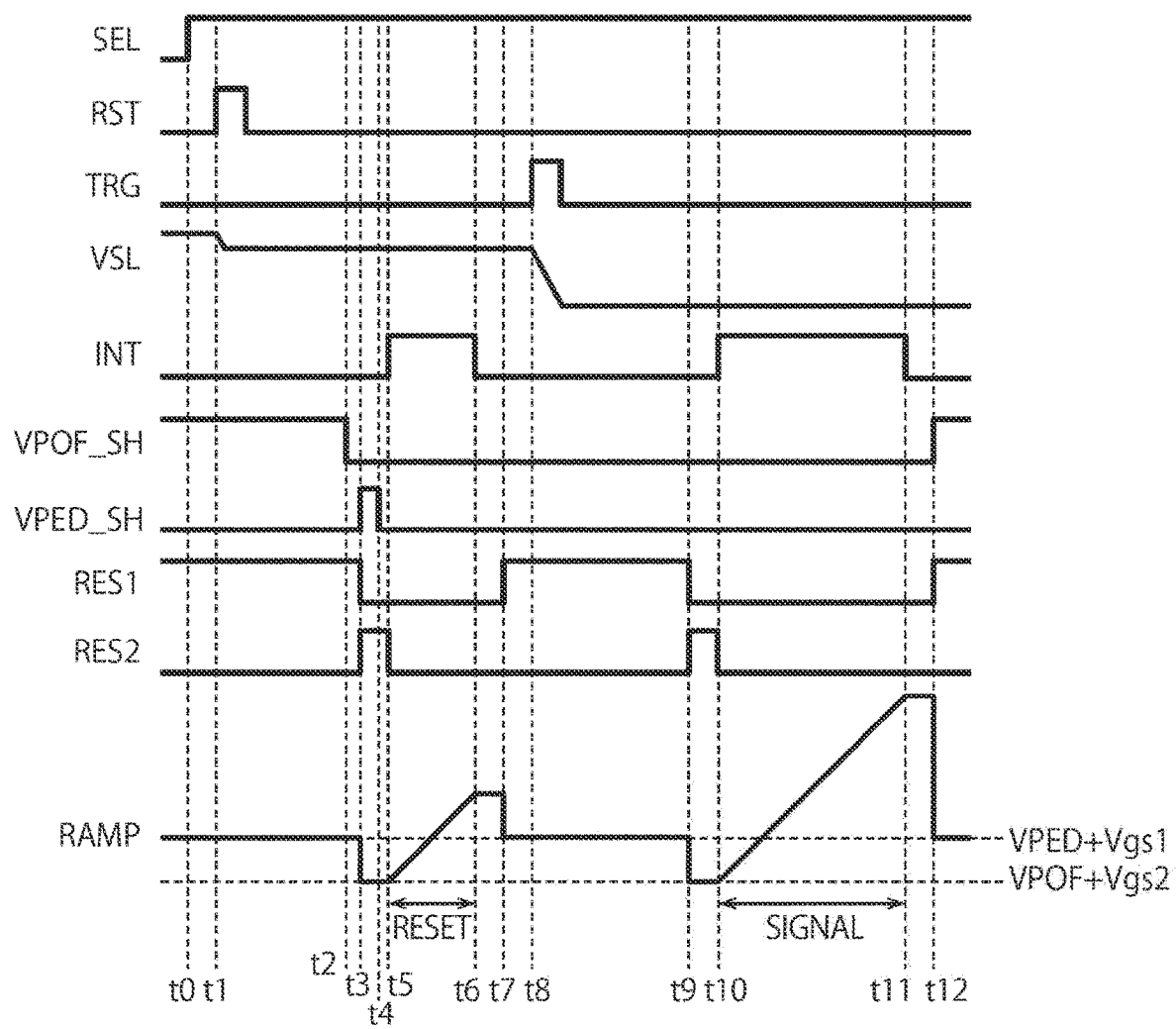
FIG. 21 is a timing diagram illustrating an example of operation of a solid-state imaging device according to the modification of FIG. 20.

FIG. 21 is a timing chart illustrating an example of operation of the solid-state imaging device 1 according to the modification of FIG. 20. FIG. 21 illustrates an example in which the ramp signal RAMP is raised substantially linearly at the time of the AD conversion of the pixel signal.

At t0 to t2 before the operation of the ramp signal RAMP is started, a control signal RES1 is at a high level, and the reset switch 202_1 is turned on. Thus, the detection transistor 600_1 functions as the source follower circuit. A control signal RES2 is at a low level, and the reset switch 202_2 is turned off. Thus, the detection transistor 600_2 does not function as the source follower circuit. In this state, the control signal VPOF_SH is at a high level, and the reference voltage switch 103_1 is turned on. Thus, the storage capacitor 102_1 is charged to the first reference voltage VPOF. At the same time, the first reference voltage VPOF is input to the input terminal IN2_1, and the integration capacitor 201 is charged to the voltage (VPOF+Vgs1). The voltage of the ramp signal RAMP becomes the voltage (VPOF+Vgs1).

At t2, the control signal VPOF_SH falls to a low level, and the reference voltage switch 103_1 is turned off. Thus, the storage capacitor 102_1 is electrically disconnected from the voltage supply unit 400 in a state of being charged to the first reference voltage VPOF, and the integration capacitor 201 maintains a state of being charged to the voltage (VPOF+Vgs1). Thus, the voltage of the ramp signal RAMP maintains the voltage (VPOF+Vgs1).

Next, at t3, the control signal RES1 becomes a low level, and the control signal RES2 rises to a high level. Thus, the reset switch 202_1 is turned off, and the reset switch 202_2 is turned on. Therefore, the detection transistor 600_2 functions as the source follower circuit, and the detection transistor 600_1 no longer function as the source follower circuit. Furthermore, the control signal VPED_SH rises to a high level, and the reference voltage switch 103_2 is turned on. Thus, the storage capacitor 102_2 is charged to the second reference voltage VPED. At the same time, the second reference voltage VPED is input to the input terminal IN2_2, and the integration capacitor 201 is charged to the voltage (VPED+Vgs2). The voltage of the ramp signal RAMP shifts to the voltage (VPED+Vgs2).

Next, at t4, the control signal VPED_SH falls to a low level, and the reference voltage switch 103_2 is turned off. Thus, the storage capacitor 102_2 is electrically disconnected from the voltage supply unit 400 in a state of being charged to the second reference voltage VPED, and the integration capacitor 201 maintains a state of being charged to the voltage (VPED+Vgs2). Thus, the voltage of the ramp signal RAMP maintains the voltage (VPED+Vgs2).

Next, at t5, the control signal RES2 falls to a low level, and the reset switch 202_2 is turned off. Thus, the reset switches 202_1 and 202_2 and the reference voltage switches 103_1 and 103_2 are all turned off.

At this time, the control signal INT rises to a high level, and the integral current switch 203 is turned on. The integral current IINT flows to the integration capacitor 201 via the integral current switch 203, and the charge is gradually extracted. At this time, as indicated by t5 to t6, the ramp signal RAMP rises substantially linearly from the voltage (VPED+Vgs2).

When the AD conversion of the reset level is completed at t6, the control signal INT falls to a low level, and the integral current switch 203 is turned off. Thus, the flow of the integral current IINT is cut off, and the operation of the ramp signal RAMP is stopped.

Next, at t7, the control signal RES1 is raised to a high level to reset the integration capacitor 201. At this time, the control signals VPOF_SH and VPED_SH maintain low levels, and the reference voltage switches 103_1 and 103_2 maintain to be off. However, the storage capacitors 102_1 and 102_2 continue to apply the reference voltages VPOF and VPED to the non-inverting input terminals IN2_1 and IN2_2, respectively. Therefore, when the reset switch 202_1 is turned on, the detection transistor 600_1 functions as the source follower circuit, and the integration capacitor 201 is reset to the voltage (VPOF+Vgs1) as the auto zero level.

Next, at t8, the pixel signal at the signal level is transferred to the vertical signal line 32, and the voltage VSL becomes the signal level.

Next, at t9, the control signal RES1 falls to a low level, and the control signal RES2 rises to a high level. Thus, the reset switch 202_1 is turned off, and the reset switch 202_2 is turned on. Thus, the detection transistor 600_2 functions as the source follower circuit, and the integration capacitor 201 shifts to the voltage (VPED+Vgs2).

Next, at t10, the control signal RES2 falls to a low level, and the reset switch 202_2 is turned off. Thus, the reset switches 202_1 and 202_2 and the reference voltage switches 103_1 and 103_2 are all turned off.

At this time, the control signal INT rises to a high level, and the integral current switch 203 is turned on. The integral current IINT flows to the integration capacitor 201 via the integral current switch 203, and the charge is gradually extracted. At this time, as indicated by t10 to t11, the ramp signal RAMP rises substantially linearly from the voltage (VPED+Vgs2).

When the AD conversion of the signal level is completed at t11, the control signal INT falls to a low level, and the integral current switch 203 is turned off. Thus, the flow of the integral current IINT is cut off, and the operation of the ramp signal RAMP is stopped. The subsequent CDS processing and the like are similar to those of other embodiments.

As in the above modification, the fifth embodiment may be combined with the fourth embodiment.

Although the offset generation unit is not illustrated in FIG. 20, the offset generation unit 300 in FIG. 13 or 15 may be applied to the present modification. In this case, the offset generation unit 300 is only required to be connected to the node N1 of FIG. 20. Thus, also in the present modification, the ramp signal RAMP can also be shifted by the offset voltage Vofs in the present modification.

Note that, in the above embodiment, the slope (analog gain) of the voltage change of the ramp signal RAMP is adjusted by the control signal AGAIN of the current source 205. For example, by decreasing the current amount of the current source 205, the integral current IINT can be reduced, and the gradient of the voltage change of the ramp signal RAMP can be made gentle. In this case, although the gain becomes high, in order to enable the detection of the pixel signal or to shorten the detection time, the shift amount from the voltage (VPOF+Vgs1) at the auto zero level to the voltage (VPED+Vgs2) needs to be relatively small. In this case, the first reference voltage VPOF or VPED output from the voltage supply unit 400 is only required to be adjusted by the control signal VPOF DATA or VPED_DATA.

(Application Example to Mobile Body)

The technology according to the present disclosure (the present technology) can be applied to various products. For example, the technology according to the present disclosure may be achieved as a device mounted on any type of mobile body such as an automobile, an electric vehicle, a hybrid electric vehicle, a motorcycle, a bicycle, a personal mobility, an airplane, a drone, a ship, a robot, and the like.

Figure 22:
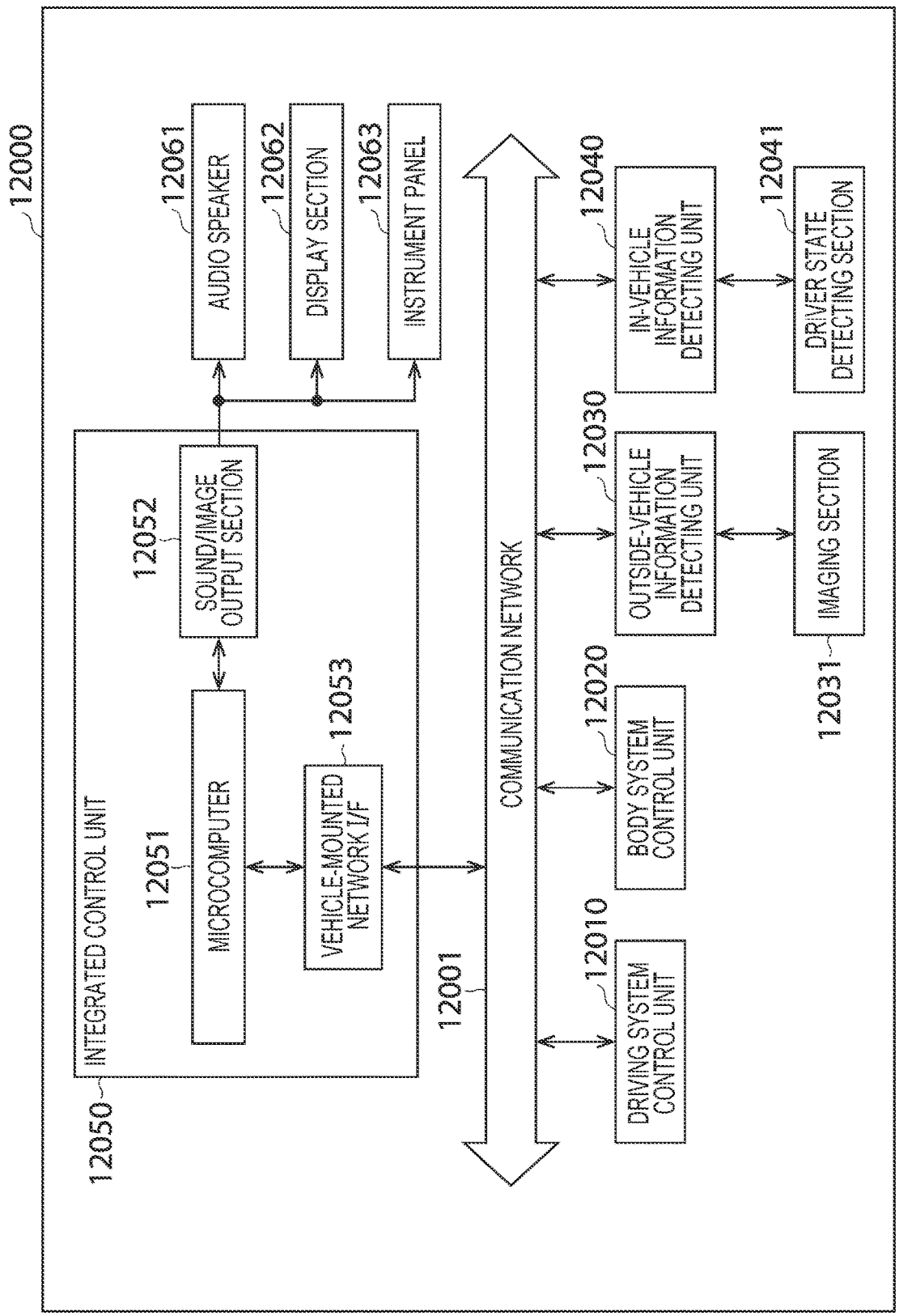
FIG. 22 is a block diagram illustrating a schematic configuration example of a vehicle control system which is an example of a mobile body control system to which the technology according to the present disclosure can be applied.

FIG. 22 is a block diagram illustrating a schematic configuration example of a vehicle control system which is an example of a mobile body control system to which the technology according to the present disclosure can be applied.

The vehicle control system 12000 includes a plurality of electronic control units connected to each other via a communication network 12001. In the example depicted in FIG. 22, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating driving force of the vehicle such as an internal combustion engine or a driving motor, a driving force transmission mechanism for transmitting driving force to wheels, a steering mechanism for adjusting a steering angle of the vehicle, and a braking device for generating a braking force of the vehicle, and the like.

The body system control unit 12020 controls operation of various devices mounted on the vehicle body according to various programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 causes the imaging section 12031 to capture an image outside the vehicle, and receives captured image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information of the inside and outside of the vehicle obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare, such as controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 22, an audio speaker 12061, a display section 12062, and an instrument panel 12063 are illustrated as the output device. The display section 12062 may, for example, include at least one of an on-board display and a head-up display.

Figure 23:
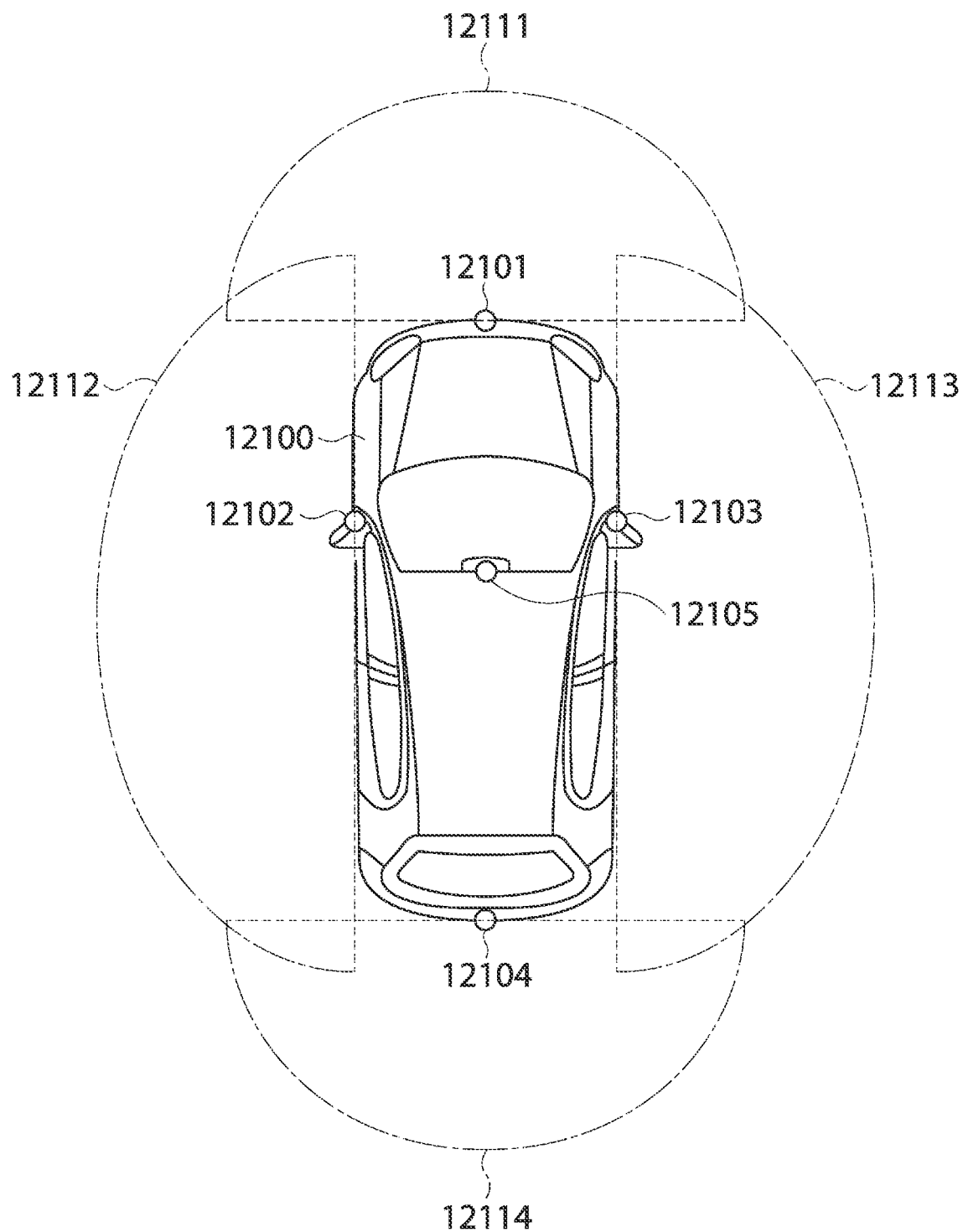
FIG. 23 is a diagram illustrating an example of an installation position of an imaging section.

FIG. 23 is a view illustrating an example of the installation position of the imaging section 12031.

In FIG. 23, the imaging section 12031 includes imaging sections 12101, 12102, 12103, 12104, and 12105.

The imaging sections 12101, 12102, 12103, 12104, and 12105 are provided, for example, at positions such as a front nose, a side mirror, a rear bumper, a back door, and an upper part of a windshield within the interior of the vehicle 12100. The imaging section 12101 provided to the front nose and the imaging section 12105 provided to the upper part of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Note that FIG. 23 illustrates an example of imaging ranges of the imaging sections 12101 to 12104. An imaging range 12111 represents the imaging range of the imaging section 12101 provided on the front nose, imaging ranges 12112 and 12113 represent the imaging ranges of the imaging sections 12102 and 12103 provided in the side mirrors, respectively, and an imaging range 12114 represents the imaging range of the imaging section 12104 provided in the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects, and the like on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating the risk of collision with each obstacle, and when the collision risk is equal to or higher than a set value and there is a possibility of collision, the microcomputer 12051 can output a warning to the driver via the audio speaker 12061 and the display section 12062, or perform forced deceleration or avoidance steering via the driving system control unit 12010, to thereby perform assistance in driving for collision avoidance.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. In addition, the sound/image output section 12052 may also control the display section 12062 so that an icon or the like representing the pedestrian is displayed at a desired position.

The example of the vehicle control system to which the technology according to the present disclosure can be applied has been described above. The technology according to the present disclosure can be applied to the imaging section 12031 and the like among the configurations described above. Specifically, the solid-state imaging device 1 can be applied to the imaging section 12031.

Note that the present technology can also employ the following configurations.

(1)

A solid-state imaging device that generates a reference signal that is compared with an electric signal from a pixel unit in order to perform analog-to-digital (AD) conversion on the electric signal and has a voltage changing with a lapse of time, the solid-state imaging device including:
  a first current circuit that causes a first current to flow;
  an output circuit including a first input unit connected to the first current circuit, a second input unit that receives a reference voltage for determining an initial value of the reference signal, and an output unit that outputs the reference signal on the basis of voltages of the first input unit and the second input unit;
  a first capacitive element that is connected to the first input unit or the output unit and changes the reference signal by accumulating or discharging the first current; and
  an offset generation unit that causes an offset current to flow through the output circuit or the first capacitive element.

(2)

The solid-state imaging device according to (1), in which
  the output circuit is a differential amplifier circuit including a first current path that receives a voltage of the first input unit, a second current path that receives a voltage of the second input unit, and a detection transistor that amplifies a voltage generated in the second current path and outputs the amplified voltage from the output unit,
  the first capacitive element is connected between the first input unit and the output unit, and
  the offset generation unit causes the offset current to flow through the first or second current path.

(3)

The solid-state imaging device according to (2), in which
  the offset generation unit includes
  a current source that causes the offset current to flow,
  a first offset switch connected between the first current path and the current source, and
  a second offset switch connected between the second current path and the current source.

(4)

The solid-state imaging device according to (3), in which
  when a voltage of the reference signal is offset in either a high direction or a low direction in the AD conversion, the first offset switch is turned on and the second offset switch is turned off, and
  when the voltage of the reference signal is offset in the other of the high direction and the low direction in the AD conversion, the first offset switch is turned off and the second offset switch is turned on.

(5)

The solid-state imaging device according to any one of (1) to (4), further including:
  a voltage generation unit that generates the reference voltage;
  a reference voltage switch provided between the voltage generation unit and the second input unit; and
  a storage capacitor connected between the second input unit and a predetermined voltage source.

(6)

The solid-state imaging device according to (5), in which
  when the reference voltage switch is on, the voltage generation unit outputs the reference voltage to charge the storage capacitor, and
  the reference voltage switch is turned off while the reference signal changes, and the storage capacitor applies the reference voltage to the second input unit.

(7)

The solid-state imaging device according to any one of (1) to (6), further including:
  a first current switch connected between the first input unit and the first current circuit;
  a second current circuit that causes a current corresponding to a current flowing through the first current path to flow through the second current path;
  a third current circuit that is connected to the first input unit and causes a second current to flow in a direction opposite to the first current; and
  a second current switch connected between the first input unit and the third current circuit.

(8)

The solid-state imaging device according to (7), in which
  when one of the first and second current switches is turned off, the other is turned on,
  when the first current switch is on, the reference signal decreases substantially linearly with a lapse of time, and
  when the second current switch is on, the reference signal rises substantially linearly with a lapse of time.

(9)

The solid-state imaging device according to (1), in which
  the output circuit includes a detection transistor having a source connected to the first input unit and the output unit and a gate connected to the second input unit, and a reset switch connected between a drain of the detection transistor and a predetermined voltage source,
  the first capacitive element is connected between a source of the detection transistor and a voltage source, and
  the first current circuit and the offset generation unit supply the first current and the offset current, respectively, to a source of the detection transistor, or cause the first current and the offset current, respectively, to flow from a source of the detection transistor.

(10)

A solid-state imaging device that generates a reference signal that is compared with an electric signal from a pixel unit in order to perform AD conversion on the electric signal and has a voltage changing with a lapse of time, the solid-state imaging device including:
  a first current circuit that causes a first current to flow;
  an output circuit including a first input unit connected to the first current circuit, a second input unit that receives a first reference voltage for determining an initial value of the reference signal, and an output unit that outputs the reference signal on the basis of voltages of the first input unit and the second input unit;

a first capacitive element that is connected to the first input unit or the output unit and changes the reference signal by accumulating or discharging the first current;

a first reference voltage switch provided between a voltage generation unit that generates the first reference voltage and the second input unit; and a first storage capacitor connected between the second input unit and a predetermined voltage source.

(11)

The solid-state imaging device according to (10), wherein the output circuit further includes a third input unit that receives a second reference voltage for shifting an initial value of the reference signal from the first reference voltage, and the solid-state imaging device further includes a second reference voltage switch provided between the voltage generation unit and the third input unit, and a second storage capacitor connected between the third input unit and the voltage source.

(12)

The solid-state imaging device according to (11), in which the output circuit is a differential amplifier circuit including a first current path that receives a voltage of the first input unit, a second current path that receives a voltage of the second input unit, a third current path that receives a voltage of the third input unit and is connected in parallel to the second current path, and a detection transistor that amplifies a voltage generated in the second or third current path and outputs the amplified voltage from the output unit, the first capacitive element is connected between the first input unit and the output unit, the first storage capacitor sets a current flowing through the second current path, and the second storage capacitor sets a current flowing through the third current path.

(13)

The solid-state imaging device according to (11) or (12), in which before the AD conversion, the first reference voltage switch and the second reference switch are turned on, and the voltage generation unit charges the first storage capacitor to the first reference voltage and charges the second storage capacitor to the second reference voltage, and both the first and second reference voltage switches are maintained to be off during the AD conversion.

(14)

The solid-state imaging device according to any one of (11) to (13), in which the first reference voltage indicates a voltage level of the reference signal when the first capacitive element is reset, and the second reference voltage indicates an initial value of the reference signal.

(15)

The solid-state imaging device according to any one of (11) to (14), further including:

a first current switch connected between the first input unit and the first current circuit;

a second current circuit that causes a current corresponding to a current flowing through the first current path to flow through the second or third current path;

a third current circuit that is connected to the first input unit and causes a second current to flow in a direction opposite to the first current; and a second current switch connected between the first input unit and the third current circuit.

(16)

The solid-state imaging device according to any one of (11) to (15), in which the output circuit includes a first detection transistor having a source connected to the first input unit and the output unit and a gate connected to the second input unit, a second detection transistor having a source connected to the first input unit and the output unit and a gate connected to the third input unit, a first reset switch connected between a drain of the first detection transistor and a predetermined voltage source, and a second reset switch connected between a drain of the second detection transistor and the voltage source, the first capacitive element is connected between the sources of the first and second detection transistors and the voltage source, and the first current circuit supplies the first current to each of the sources of the first and second detection transistors, or causes the first current to flow from each of the sources of the first and second detection transistors.

Note that the present disclosure is not limited to the above-described embodiments, and various modifications can be made without departing from the gist of the present disclosure. The above embodiments may be combined as appropriate. Furthermore, the effects described in the present description are merely examples and are not limited, and other effects may be provided.

REFERENCE SIGNS LIST

14B Reference signal generation unit
200 Differential amplifier circuit
201 Integration capacitor
202 Reset switch
203 Integral current switch
204 Current mirror circuit
205 Current source
300 Offset generation unit
Trin1, Trin2 Input transistor
Trmr1, Trmr2 Mirror transistor
Trsen Detection transistor
210, 220 Current source
IN1 Inverting input terminal
IN2 Non-inverting input terminal
INa, INb Offset input terminal

The invention claimed is:

1. A solid-state imaging device that generates a reference signal that is compared with an electric signal from a pixel in order to perform analog-to-digital (AD) conversion on the electric signal and has a voltage changing with a lapse of time, the solid-state imaging device comprising:

a first current circuit that causes a first current to flow;

an output circuit including a first input connected to the first current circuit, a second input that receives a reference voltage for determining an initial value of the reference signal, and an output that outputs the reference signal on a basis of voltages of the first input and the second input;

a first capacitive element that is connected to the first input or the output and changes the reference signal by accumulating or discharging the first current; and an offset generation circuit that causes an offset current to flow through the output circuit or the first capacitive element, wherein the output circuit is a differential amplifier circuit including a first current path that receives a voltage of the first input, a second current path that receives a voltage of the second input, and a detection transistor that amplifies a voltage generated in the second current path and outputs the amplified voltage from the output, the first capacitive element is connected between the first input and the output, the offset generation circuit causes the offset current to flow through the first or second current path, the offset generation circuit includes a current source that causes the offset current to flow, a first offset switch connected between the first current path and the current source, and a second offset switch connected between the second current path and the current source, when a voltage of the reference signal is offset in a first voltage offset direction in the AD conversion, the first offset switch is turned on and the second offset switch is turned off, and when the voltage of the reference signal is offset in a second voltage offset direction in the AD conversion, the first offset switch is turned off and the second offset switch is turned on.

2. The solid-state imaging device according to claim 1, further comprising:

a voltage generation circuit that generates the reference voltage;

a reference voltage switch provided between the voltage generation circuit and the second input; and a storage capacitor connected between the second input and a predetermined voltage source.

3. The solid-state imaging device according to claim 2, wherein when the reference voltage switch is on, the voltage generation circuit outputs the reference voltage to charge the storage capacitor, and the reference voltage switch is turned off while the reference signal changes, and the storage capacitor applies the reference voltage to the second input.

4. A solid-state imaging device that generates a reference signal that is compared with an electric signal from a pixel in order to perform analog-to-digital (AD) conversion on the electric signal and has a voltage changing with a lapse of time, the solid-state imaging device comprising:

a first current circuit that causes a first current to flow:

an output circuit including a first input connected to the first current circuit, a second input that receives a reference voltage for determining an initial value of the reference signal, and an output that outputs the reference signal on a basis of voltages of the first input and the second input;

a first capacitive element that is connected to the first input or the output and changes the reference signal by accumulating or discharging the first current;

an offset generation circuit that causes an offset current to flow through the output circuit or the first capacitive element;

a first current switch connected between the first input and the first current circuit;

a second current circuit that causes a current corresponding to a current flowing through a first current path to flow through a second current path;

a third current circuit that is connected to the first input and causes a second current to flow in a direction opposite to the first current; and a second current switch connected between the first input and the third current circuit.

5. The solid-state imaging device according to claim 4, wherein when one of the first and second current switches is turned off, the other is turned on, when the first current switch is on, the reference signal decreases substantially linearly with a lapse of time, and when the second current switch is on, the reference signal rises substantially linearly with a lapse of time.

6. A solid-state imaging device that generates a reference signal that is compared with an electric signal from a pixel in order to perform analog-to-digital (AD) conversion on the electric signal and has a voltage changing with a lapse of time, the solid-state imaging device comprising:

a first current circuit that causes a first current to flow;

an output circuit including a first input connected to the first current circuit, a second input that receives a reference voltage for determining an initial value of the reference signal, and an output that outputs the reference signal on a basis of voltages of the first input and the second input;

a first capacitive element that is connected to the first input or the output and changes the reference signal by accumulating or discharging the first current; and an offset generation circuit that causes an offset current to flow through the output circuit or the first capacitive element, wherein the output circuit includes a detection transistor having a source connected to the first input and the output and a gate connected to the second input, and a reset switch connected between a drain of the detection transistor and a predetermined voltage source, the first capacitive element is connected between a source of the detection transistor and a voltage source, and the first current circuit and the offset generation circuit supply the first current and the offset current, respectively, to a source of the detection transistor, or cause the first current and the offset current, respectively, to flow from a source of the detection transistor.

7. A solid-state imaging device that generates a reference signal that is compared with an electric signal from a pixel in order to perform AD conversion on the electric signal and has a voltage changing with a lapse of time, the solid-state imaging device comprising:

a first current circuit that causes a first current to flow;

an output circuit including a first input connected to the first current circuit, a second input that receives a first reference voltage for determining an initial value of the reference signal, an output that outputs the reference signal on a basis of voltages of the first input and the second input, and a third input that receives a second reference voltage for shifting an initial value of the reference signal from the first reference voltage;

a first capacitive element that is connected to the first input or the output and changes the reference signal by accumulating or discharging the first current;

a first reference voltage switch provided between a voltage generation circuit that generates the first reference voltage and the second input;

a first storage capacitor connected between the second input and a predetermined voltage source;

a second reference voltage switch provided between the voltage generation circuit and the third input; and a second storage capacitor connected between the third input and the voltage source.

8. The solid-state imaging device according to claim 7, wherein the output circuit is a differential amplifier circuit including a first current path that receives a voltage of the first input, a second current path that receives a voltage of the second input, a third current path that receives a voltage of the third input and is connected in parallel to the second current path, and a detection transistor that amplifies a voltage generated in the second or third current path and outputs the amplified voltage from the output, the first capacitive element is connected between the first input and the output, the first storage capacitor sets a current flowing through the second current path, and the second storage capacitor sets a current flowing through the third current path.

9. The solid-state imaging device according to claim 7, wherein before the AD conversion, the first reference voltage switch and the second reference switch are turned on, and the voltage generation circuit charges the first storage capacitor to the first reference voltage and charges the second storage capacitor to the second reference voltage, and both the first and second reference voltage switches are maintained to be off during the AD conversion.

10. The solid-state imaging device according to claim 7, wherein the first reference voltage indicates a voltage level of the reference signal when the first capacitive element is reset, and the second reference voltage indicates an initial value of the reference signal.

11. The solid-state imaging device according to claim 8, further comprising:

a first current switch connected between the first input and the first current circuit and a second current circuit that causes a current corresponding to a current flowing through the first current path to flow through the second or third current path;

a third current circuit that is connected to the first input and causes a second current to flow in a direction opposite to the first current; and a second current switch connected between the first input and the third current circuit.

12. The solid-state imaging device according to claim 7, wherein the output circuit includes a first detection transistor having a source connected to the first input and the output and a gate connected to the second input, a second detection transistor having a source connected to the first input and the output and a gate connected to the third input, a first reset switch connected between a drain of the first detection transistor and a predetermined voltage source, and a second reset switch connected between a drain of the second detection transistor and the voltage source, the first capacitive element is connected between the sources of the first and second detection transistors and the voltage source, and the first current circuit supplies the first current to each of the sources of the first and second detection transistors, or causes the first current to flow from each of the sources of the first and second detection transistors.

* * * * *